(12) United States Patent
Koretake

(10) Patent No.: US 7,689,464 B2
(45) Date of Patent: Mar. 30, 2010

(54) ELECTRONIC ACCOUNTING-DOCUMENT SYSTEM, ELECTRONIC ACCOUNTING-DOCUMENT PROCESSING METHOD, ACCOUNTING-DOCUMENT CREATION UNIT, AND ACCOUNTING-DOCUMENT PROCESSING UNIT

(75) Inventor: Tsuyoshi Koretake, Takatsuki (JP)

(73) Assignee: Panasonic Corporation, Osaka (JP)

( * ) Notice: Subject to any disclaimer, the term of this patent is extended or adjusted under 35 U.S.C. 154(b) by 1278 days.

(21) Appl. No.: 11/039,917

(22) Filed: Jan. 24, 2005

(65) Prior Publication Data

US 2005/0165664 A1    Jul. 28, 2005

(30) Foreign Application Priority Data

Jan. 23, 2004    (JP)    ............................. 2004-015486

(51) Int. Cl.
*Q06Q 30/00*    (2006.01)
*G06F 15/00*    (2006.01)

(52) U.S. Cl. ........................................ 705/26; 364/408
(58) Field of Classification Search ................ 705/1, 705/26, 30
See application file for complete search history.

(56) References Cited

U.S. PATENT DOCUMENTS 4,933,842 A * 6/1990 Durbin et al. ............. 705/36 R
4,948,174 A * 8/1990 Thomson et al. ............... 283/58

FOREIGN PATENT DOCUMENTS

JP    6-214902    8/1994
JP    6-324820    11/1994

OTHER PUBLICATIONS

Foreign Reference: Takahiro et al., System for Reducing Transferred Data Amount to Distributed Machine, Publication date: Aug. 5, 1994.*
Japanese Office Action (along with English language translation) issued Oct. 14, 2008 in the Japanese Application No. 2005-012517.
Evolving electronic accounting-document system, Nikkei Windows 2000, Nikkei Business Publications, Inc., Nov. 1, 2000, vol. 44, pp. 189-194.
Special number on electronic accounting-document, Nikkei Windows NT, Nikkei Business Publications, Inc., Jan. 1, 1999, vol. 22, pp. 171-178.

* cited by examiner

*Primary Examiner*—Matthew S Gart
*Assistant Examiner*—Garcia Ade
(74) *Attorney, Agent, or Firm*—Wenderoth, Lind & Ponack, L.L.P.

(57) ABSTRACT

An electronic accounting-document system, an electronic accounting-document processing method, an accounting-document creation unit and an accounting-document processing unit are provided in which the time that is taken to transmit and process accounting-document data can be shortened. An accounting-document creation section creates accounting-document data on an accounting document; an accounting-document data division section divides the accounting-document data into accounting-document present data and accounting-document absent data; a data transmission section transmits the accounting-document present data and the accounting-document absent data which is received by a data receiving section; an accounting-document data monitoring section identifies the accounting-document present data and the accounting-document absent data; a distribution accounting-document data creation section processes and stores, as accounting-document data for distribution, the accounting-document present data so that it can be output to a CD-R; and a distribution accounting-document data updating section updates the distribution accounting-document data, based on the accounting-document absent data.

8 Claims, 19 Drawing Sheets

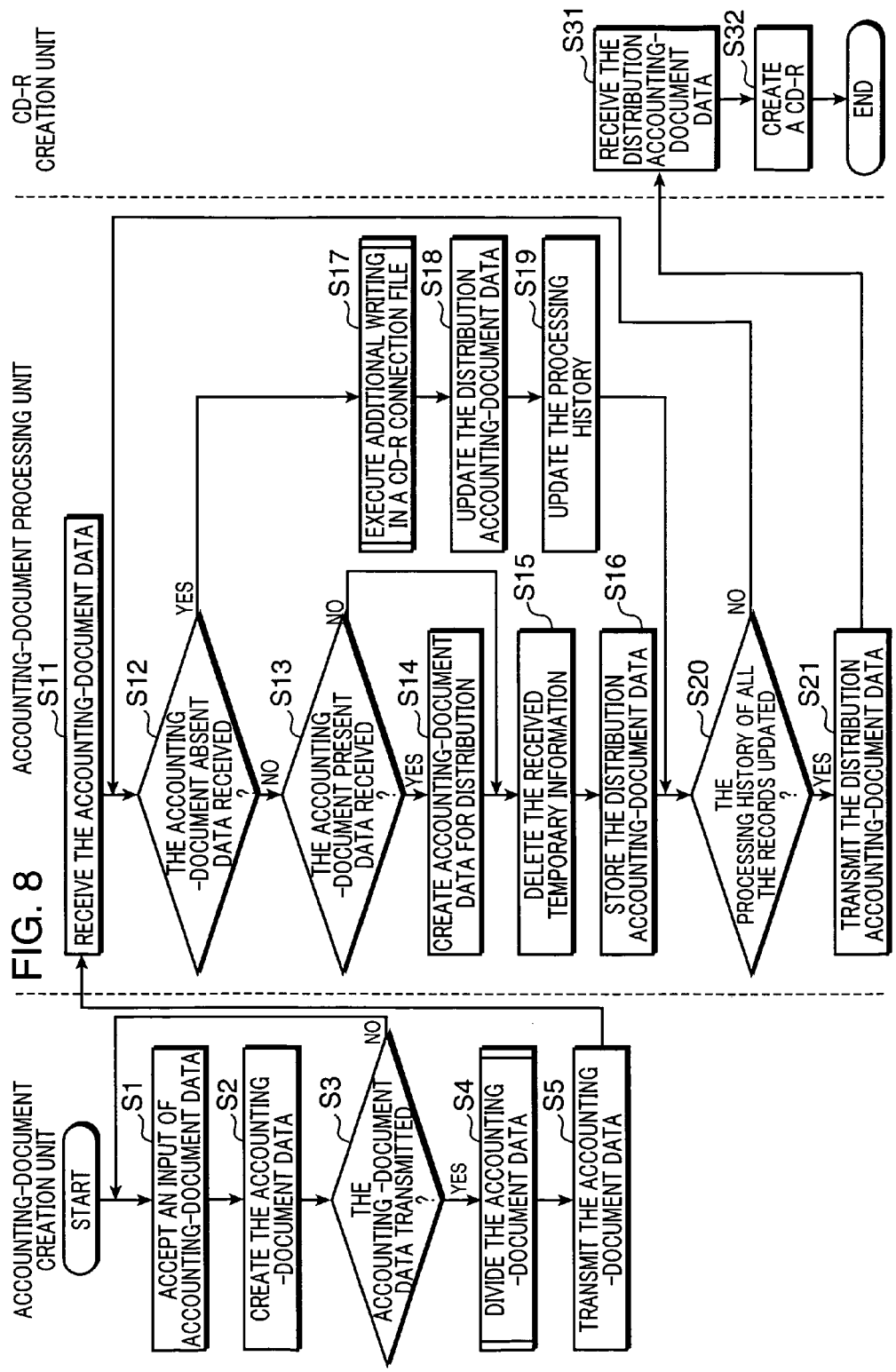

FIG. 9A

| CREATED CD-R UNIT EXAMPLE (401) | ACCOUNTING-DOCUMENT NAME EXAMPLE (402) | THE NUMBER OF PAGES | (403) |
|---|---|---|---|
| CREDIT MANAGEMENT/ PRODUCT-MERCHANDISE ACCOUNTS IN AN A_DEPARTMENT | TERM-END NO1 CORPOREAL FIXED-ASSETS MOVEMENT OVERALL-LIST J | 0 | 0-PIECE ACCOUNTING DOCUMENTS (NO DISPLAY) |
| | SDP MERCHANDISE LEDGER | 0 | |
| | SDP MERCHANDISE LEDGER (FOR EACH BASE PLACE) | 0 | |
| | MERCHANDISE LEDGER | 200 | THERE IS ACCOUNTING-DOCUMENT DATA |
| | MERCHANDISE LEDGER (FOR EACH BASE PLACE) | 300 | |
| | SDP INVENTORY DAILY BULLETIN | 100 | |
| | SDP INVENTORY DAILY BULLETIN (FOR EACH BASE PLACE) | 300 | |
| | INVENTORY DAILY BULLETIN | 100 | |
| | INVENTORY DAILY BULLETIN (FOR EACH BASE PLACE) | 500 | |
| | INVENTORY ANALYSIS LIST | 0 | |
| | MEGAS TIE-UP PROOF (FOR BRANCH OFFICES) | 0 | |
| | TERM-END NO2 CORPOREAL FIXED-ASSETS MOVEMENT OVERALL-LIST H | ... | |
| | CONNECTED CHARGE-ACCOUNT-DEBIT BALANCE ACCOUNT LIST (A BOOKS-CLOSING DATE) | | |
| | TERM-END NO1 CORPOREAL FIXED-ASSETS MOVEMENT OVERALL-LIST H | | |
| | PROJECT PLAN: FIXED-ASSETS EXPENSES ESTIMATES | | |
| | CONTRACT PROVISIONAL FLUCTUATION: CORPOREAL FIXED-ASSETS MOVEMENT OVERALL-LIST J | | |
| | CONTRACT PROVISIONAL FLUCTUATION: CORPOREAL FIXED-ASSETS MOVEMENT OVERALL-LIST H | | |
| | CORPOREAL FIXED-ASSETS MOVEMENT OVERALL-LIST J | | |
| | CORPOREAL FIXED-ASSETS MOVEMENT OVERALL-LIST H | | |
| | OVERALL MARKET-MANAGEMENT EXPENSES PAYMENT ESTIMATES | | |
| | CONTRACT-COMPANY DISTRIBUTION-COSTS SUMMING-UP LIST | | |
| | CHARGE-ACCOUNT-DEBIT BALANCE SUMMING-UP LIST (A BOOKS-CLOSING DATE) | | |
| | TERM-END NO2 CORPOREAL FIXED-ASSETS MOVEMENT OVERALL-LIST J | | |
| | RESULT LIST (THE ACCOUNT OF PAYMENTS) 〈FOR PROJECTS〉 | | |
| | TERM-END NO1 (ON THE ANNUAL BASE): PROPERTY APPRAISALS | | |

FIG. 9B

| CREATED CD-R UNIT EXAMPLE (401) | ACCOUNTING-DOCUMENT NAME EXAMPLE (402) | THE NUMBER OF PAGES (403) | |
|---|---|---|---|
| MATERIAL/ COST MANAGEMENT IN A B_DEPARTMENT (502) | HALF-FINISHED PRODUCT INVENTORY/TRANSFER PROOF-LIST | 1000 | } THERE IS ACCOUNTING-DOCUMENT DATA |
| | MANUFACTURING-INVENTORY RECORD PROOF-LIST | 0 | |
| | HALF-FINISHED PRODUCT UNMOVED-INVENTORY FACTOR ANALYSIS AND ITS RESOLUTION-MEASURES MATERIAL | 0 | } 0-PIECE ACCOUNTING DOCUMENTS (NO DISPLAY) |
| | CASH-FLOW ESTIMATES | 0 | |
| | ... | ... | |
| EXPORTS SALES ACCOUNTS IN A C_DEPARTMENT (503) | WORKPLACE-INVENTORY CARRY-OVER CORRECTION SPECIFICATION | 0 | } 0-PIECE ACCOUNTING DOCUMENTS (NO DISPLAY) |
| | GLOBAL HEADQUARTER EXPENSES AND OVERSEAS DIVISIONS IN TOTAL | 0 | |
| | GLOBAL HEADQUARTER EXPENSES AND REGIONAL HEAD OFFICES IN TOTAL | 300 | } THERE IS ACCOUNTING-DOCUMENT DATA |
| | BANK MASTER-CODE BOOK | | |
| | BANK BRANCH-OFFICE MASTER-CODE BOOK | | |
| ... | ... | ... | |

ELECTRONIC ACCOUNTING-DOCUMENT SYSTEM, ELECTRONIC ACCOUNTING-DOCUMENT PROCESSING METHOD, ACCOUNTING-DOCUMENT CREATION UNIT, AND ACCOUNTING-DOCUMENT PROCESSING UNIT

BACKGROUND OF THE INVENTION

1. Field of the Invention

The present invention relates to an electronic accounting-document system which allows an accounting-document processing unit to process accounting-document data that is created by an accounting-document creation unit. It also relates to an electronic accounting-document processing method, an accounting-document creation unit and an accounting-document processing unit for the same purpose.

2. Description of the Related Art

Conventionally, an electronic accounting-document system is known in which an accounting-document creation unit and an accounting-document processing unit are connected (e.g., refer to Japanese Unexamined Patent Publication No. 6-324820 specification). In that system, first, the accounting-document creation unit creates accounting-document data and transmits the accounting-document data to the accounting-document processing unit. Then, the accounting-document processing unit receives and manages the accounting-document data. In such an electronic accounting-document system, the recent computerization prompts the recording of accounting-document data in a CD-R.

In such an electronic accounting-document system as described above, an accounting-document creation unit transmits data, in each accounting-document unit, to an accounting-document processing unit, whether or not it includes accounting-document data. For example, in the case where a certain company handles accounting-document data, the total number of pieces of accounting-document data which actually includes accounting-document data is 18300. On the other hand, the total number of pieces of so-called 0-piece accounting-document data which does not include any accounting-document data is 102406. In that case, the accounting-document creation unit transmits blank data, some 100-thousand times, to the accounting-document processing unit, even though they have none of accounting-document data. This requires the accounting-document processing unit to process about 100-thousand pieces of blank accounting-document data.

In the above described conventional electronic accounting-document system, even if there is no accounting-document data, the accounting-document creation unit transmits data to the accounting-document processing unit. Hence, the time is wasted on such a transmission. Besides, in the above described conventional electronic accounting-document system, even though no accounting-document data exists, the accounting-document processing unit needs to process the data which has been transmitted from the accounting-document creation unit. This processing also takes a long time.

BRIEF SUMMARY OF INVENTION

In order to resolve the above described disadvantages, it is an object of the present invention to provide an electronic accounting-document system, an electronic accounting-document processing method, an accounting-document creation unit, and an accounting-document processing unit, in which the time that is taken to transmit and process accounting-document data can be shortened.

The electronic accounting-document system according to the present invention which allows an accounting-document processing unit to process accounting-document data that is created by an accounting-document creation unit, wherein: the accounting-document creation unit includes, an accounting-document data creating means for creating accounting-document data on an accounting document, an accounting-document data dividing means for dividing the accounting-document data which is created by the accounting-document data creating means, into accounting-document present data which has the accounting-document data and accounting-document absent data which does not have the accounting-document data, and an accounting-document data transmitting means for transmitting the accounting-document present data and the accounting-document absent data which are obtained by the division of the accounting-document data dividing means; and the accounting-document processing unit includes, a receiving means for receiving the accounting-document present data and the accounting-document absent data which are transmitted by the accounting-document data transmitting means, a monitoring means for monitoring the accounting-document present data and the accounting-document absent data which are received by the receiving means, and identifying the accounting-document present data and the accounting-document absent data, a data processing means for giving a predetermined data processing for outputting, in an arbitrary format, the accounting-document present data which is identified by the monitoring means, a storing means for storing, as accounting-document data for an output, the accounting-document present data which is given the predetermined data processing by the data processing means, and an updating means for, without giving a predetermined data processing for outputting the accounting-document absent data which is identified by the monitoring means in an arbitrary format, updating the output accounting-document data which is stored in the storing means, based on the accounting-document absent data which is identified by the monitoring means.

According to this configuration, in the accounting-document creation unit, accounting-document data on an accounting document is created, and then, the created accounting-document data is divided into accounting-document present data which has the accounting-document data and accounting-document absent data which does not have the accounting-document data. Next, the accounting-document present data and the accounting-document absent data which have been obtained by the division are transmitted. Then, in the accounting-document processing unit, the transmitted accounting-document present data and accounting-document absent data are received. Next, the received accounting-document present data and accounting-document absent data are monitored, and then, the accounting-document present data and accounting-document absent data are identified. Sequentially, a predetermined data processing is given to the accounting-document present data, so that it can be outputted in an arbitrary format. Then, the accounting-document present data which has been given the predetermined data processing is stored as accounting-document data for an output. On the other hand, without giving a predetermined data processing to the identified accounting-document absent data so that it can be outputted in an arbitrary format, the stored output accounting-document data is updated, based on the identified accounting-document absent data.

Hence, the accounting-document data is divided into accounting-document present data in which there is the accounting-document data and accounting-document absent data in which there is not the accounting-document data. Therefore, the time that is taken to transmit the accounting-document data becomes shorter than that in the case where the accounting-document data is conventionally transmitted, whether the accounting document exists or not. In addition, a predetermined data processing is given to the accounting-document present data so that it can be outputted in an arbitrary format, the accounting-document present data which has been given the predetermined data processing is stored as the output accounting-document data, and the stored output accounting-document data is updated based on the accounting-document absent data. Therefore, the time that is taken to process the accounting-document data becomes shorter than in the case where the predetermined data processing is conventionally given to all the accounting-document data so that it can be outputted in an arbitrary format, whether or not there is the accounting document.

Furthermore, in the above described electronic accounting-document system, it is preferable that: the accounting-document creation unit further include an identification-information giving means for giving the accounting-document present data which is obtained by the division of the accounting-document data dividing means identification information for identifying the accounting-document present data, and giving the accounting-document absent data identification information for identifying the accounting-document absent data; the accounting-document data transmitting means transmit the accounting-document present data and the accounting-document absent data which are each given the identification information by the identification-information giving means; and the monitoring means of the accounting-document processing unit monitor the accounting-document present data and the accounting-document absent data which are received by the receiving means, and identify the accounting-document present data and the accounting-document absent data, based on the identification information of the accounting-document present data and the identification information of the accounting-document absent data.

According to this configuration, whether the received data is the accounting-document present data or the accounting-document absent data can be identified, based on the identification information which is given to the accounting-document present data and the identification information which is given to the accounting-document absent data.

Moreover, in the above described electronic accounting-document system, preferably: the accounting-document processing unit should further include an output accounting-document data transmitting means for transmitting the output accounting-document data which is updated by the updating means; and the electronic accounting-document system should further comprise an output unit which receives the output accounting-document data which is transmitted by the output accounting-document data transmitting means, and outputs the output accounting-document data in an arbitrary format.

According to this configuration, in the accounting-document processing unit, the updated output accounting-document data is transmitted. In addition, in the output unit, the transmitted output accounting-document data is received, and the received output accounting-document data is outputted in an arbitrary format. Therefore, the accounting-document data which has been created in the accounting-document creation unit can be outputted in an optional format.

Furthermore, in the above described electronic accounting-document system, it is preferable that the output unit record, in a record medium, the output accounting-document data which is transmitted by the output accounting-document data transmitting means, and output the output accounting-document data.

According to this configuration, in the output unit, the output accounting-document data which is transmitted from the accounting-document processing unit is recorded in the record medium, and then, it is outputted. Therefore, for example, a statutory accounting document can be computerized and stored. Besides, record-medium data can be created within a far shorter period of time.

Moreover, in the above described electronic accounting-document system, preferably, the accounting-document data transmitting means should transmit, in a batch for each record medium, the accounting-document absent data which does not have the accounting-document data.

According to this configuration, using the accounting-document data transmitting means, the accounting-document absent data which does not have the accounting-document data is transmitted in a lump for each record medium. Therefore, the time that is required to transmit the accounting-document data becomes shorter than that in the case where the accounting-document data is conventionally transmitted, whether the accounting document exists or not.

In addition, in the above described electronic accounting-document system, it is preferable that: the accounting-document absent data include accounting-document specification information for specifying an accounting document, and record-medium specification information for specifying a record medium; and the updating means specify the output accounting-document data which is stored in the storing means, based on the record-medium specification information of the accounting-document absent data which is identified by the monitoring means, and update the output accounting-document data, based on the accounting-document specification information of the accounting-document absent data.

According to this configuration, the accounting-document absent data includes accounting-document specification information for specifying an accounting document, and record-medium specification information for specifying a record medium. Based upon the record-medium specification information of the accounting-document absent data, the output accounting-document data is specified which is stored in the storing means. Then, the specified output accounting-document data is updated, based on the accounting-document specification information of the accounting-document absent data.

Therefore, the accounting-document absent data includes the accounting-document specification information for specifying an accounting document, and the record-medium specification information for specifying a record medium, thus reducing the quantity of data to be transmitted.

The electronic accounting-document processing method according to the present invention by which an accounting-document processing unit processes accounting-document data that is created by an accounting-document creation unit, comprising: a receiving step of receiving accounting-document present data which has the accounting-document data and accounting-document absent data which does not have the accounting-document data; a monitoring step of monitoring the accounting-document present data and the accounting-document absent data which are received in the receiving step, and identifying the accounting-document present data and the accounting-document absent data; a data processing step of giving a predetermined data processing for outputting, in an arbitrary format, the accounting-document present data which is identified in the monitoring step; a storing step of storing, as accounting-document data for an output, the accounting-document present data which is given the predetermined data processing in the data processing step; and an updating step of, without giving a predetermined data processing for outputting the accounting-document absent data which is identified in the monitoring step in an arbitrary format, updating the output accounting-document data which is stored in the storing step, based on the accounting-document absent data which is identified in the monitoring step.

According to this configuration, the accounting-document present data which has the accounting-document data and the accounting-document absent data which does not have the accounting-document data are received. Next, the received accounting-document present data and accounting-document absent data are monitored, and then, the accounting-document present data and accounting-document absent data are identified. Sequentially, a predetermined data processing is given to the accounting-document present data, so that it can be outputted in an arbitrary format. Then, the accounting-document present data which has been given the predetermined data processing is stored as accounting-document data for an output. On the other hand, without giving a predetermined data processing to the identified accounting-document absent data so that it can be outputted in an arbitrary format, the stored output accounting-document data is updated, based on the identified accounting-document absent data.

Hence, a predetermined data processing is given to the accounting-document present data which includes the accounting-document data so that it can be outputted in an arbitrary format, the accounting-document present data which has been given the predetermined data processing is stored as the output accounting-document data, and the stored output accounting-document data is updated based on the accounting-document absent data which does not include the accounting-document data. Therefore, the time that is taken to process the accounting-document data becomes shorter than in the case where the predetermined data processing is conventionally given to all the accounting-document data so that it can be outputted in an arbitrary format, whether or not there is the accounting document.

The accounting-document creation unit according to the present invention which creates accounting-document data, comprising: an accounting-document data creating means for creating accounting-document data on an accounting document; an accounting-document data dividing means for dividing the accounting-document data which is created by the accounting-document data creating means, into accounting-document present data which has the accounting-document data and accounting-document absent data which does not have the accounting-document data; and an accounting-document data transmitting means for transmitting the accounting-document present data and the accounting-document absent data which are obtained by the division of the accounting-document data dividing means.

According to this configuration, accounting-document data on an accounting document is created, and then, the created accounting-document data is divided into accounting-document present data which has the accounting-document data and accounting-document absent data which does not have the accounting-document data. Next, the accounting-document present data and the accounting-document absent data which have been obtained by the division are transmitted.

Hence, the accounting-document data is divided into accounting-document present data in which there is the accounting-document data and accounting-document absent data in which there is not the accounting-document data. Therefore, the time that is taken to transmit the accounting-document data becomes shorter than that in the case where the accounting-document data is conventionally transmitted, whether the accounting document exists or not.

Furthermore, the above described accounting-document creation unit, preferably, should further comprise, an identification-information giving means for giving the accounting-document present data which is obtained by the division of the accounting-document data dividing means identification information for identifying the accounting-document present data, and giving the accounting-document absent data identification information for identifying the accounting-document absent data, wherein the accounting-document data transmitting means should transmit the accounting-document present data and the accounting-document absent data which are each given the identification information by the identification-information giving means.

According to this configuration, whether the received data is the accounting-document present data or the accounting-document absent data can be identified, based on the identification information which is given to the accounting-document present data and the identification information which is given to the accounting-document absent data.

Moreover, in the above described electronic accounting-document system, it is preferable that the accounting-document data transmitting means transmit, in a batch for each of record mediums, the accounting-document absent data which does not have the accounting-document data.

According to this configuration, using the accounting-document data transmitting means, the accounting-document absent data which does not have the accounting-document data is transmitted in a lump for each record medium. Therefore, the time that is required to transmit the accounting-document data becomes shorter than that in the case where the accounting-document data is conventionally transmitted, whether the accounting document exists or not.

The accounting-document processing unit according to the present invention which executes a predetermined processing for accounting-document data that is created by an accounting-document creation unit, comprising: a receiving means for receiving the accounting-document data which is transmitted by the accounting-document creation unit after the accounting-document data is divided, by the accounting-document creation unit, into accounting-document present data which has the accounting-document data and accounting-document absent data which does not have the accounting-document data; a monitoring means for monitoring the accounting-document present data and the accounting-document absent data which are received by the receiving means, and identifying the accounting-document present data and the accounting-document absent data; a data processing means for giving a predetermined data processing for outputting, in an arbitrary format, the accounting-document present data which is identified by the monitoring means; a storing means for storing, as accounting-document data for an output, the accounting-document present data which is given the predetermined data processing by the data processing means; and an updating means for, without giving a predetermined data processing for outputting the accounting-document absent data which is identified by the monitoring means in an arbitrary format, updating the output accounting-document data which is stored in the storing means, based on the accounting-document absent data which is identified by the monitoring means.

According to this configuration, the receiving means receives the accounting-document data which is transmitted by the accounting-document creation unit after the accounting-document data has been divided, by the accounting-document creation unit, into accounting-document present data which has the accounting-document data and accounting-document absent data which does not have the accounting-document data. Next, the received accounting-document present data and accounting-document absent data are monitored, and then, the accounting-document present data and accounting-document absent data are identified. Sequentially, a predetermined data processing is given to the accounting-document present data, so that it can be outputted in an arbitrary format. Then, the accounting-document present data which has been given the predetermined data processing is stored as accounting-document data for an output. On the other hand, without giving a predetermined data processing to the identified accounting-document absent data so that it can be outputted in an arbitrary format, the stored output accounting-document data is updated, based on the identified accounting-document absent data.

Hence, a predetermined data processing is given to the accounting-document present data so that it can be outputted in an arbitrary format, the accounting-document present data which has been given the predetermined data processing is stored as the output accounting-document data, and the stored output accounting-document data is updated based on the accounting-document absent data. Therefore, the time that is taken to process the accounting-document data becomes shorter than in the case where the predetermined data processing is conventionally given to all the accounting-document data so that it can be outputted in an arbitrary format, whether or not there is the accounting document.

Furthermore, in the above described accounting-document processing unit, it is preferable that: the accounting-document creation unit give identification information for identifying the accounting-document present data to the accounting-document present data, and give identification information for identifying the accounting-document absent data to the accounting-document absent data; and the monitoring means monitor the accounting-document present data and the accounting-document absent data which are received by the receiving means, and identify the accounting-document present data and the accounting-document absent data, based on the identification information of the accounting-document present data and the identification information of the accounting-document absent data.

According to this configuration, by the accounting-document creation unit, identification information for identifying the accounting-document present data is given to the accounting-document present data, and identification information for identifying the accounting-document absent data is given to the accounting-document absent data. Then, the received accounting-document present data and accounting-document absent data are monitored. Next, the accounting-document present data and the accounting-document absent data are identified, based on the identification information of the accounting-document present data and the identification information of the accounting-document absent data.

Therefore, whether the received data is the accounting-document present data or the accounting-document absent data can be identified, based on the identification information which is given to the accounting-document present data and the identification information which is given to the accounting-document absent data.

Moreover, in the above described accounting-document processing unit, it is preferable that: the accounting-document absent data include accounting-document specification information for specifying an accounting document, and record-medium specification information for specifying a record medium; and the updating means specify the output accounting-document data which is stored in the storing means, based on the record-medium specification information of the accounting-document absent data which is identified by the monitoring means, and update the output accounting-document data, based on the accounting-document specification information of the accounting-document absent data.

According to this configuration, the accounting-document absent data includes accounting-document specification information for specifying an accounting document, and record-medium specification information for specifying a record medium. Based upon the record-medium specification information of the accounting-document absent data, the output accounting-document data is specified which is stored in the storing means. Then, the specified output accounting-document data is updated, based on the accounting-document specification information of the accounting-document absent data.

Therefore, the accounting-document absent data includes the accounting-document specification information for specifying an accounting document, and the record-medium specification information for specifying a record medium, thus reducing the quantity of data to be transmitted.

In the electronic accounting-document system according to the present invention, the accounting-document data is divided into accounting-document present data in which there is the accounting-document data and accounting-document absent data in which there is not the accounting-document data. Therefore, the time that is taken to transmit the accounting-document data becomes shorter than that in the case where the accounting-document data is conventionally transmitted, whether the accounting document exists or not.

In addition, a predetermined data processing is given to the accounting-document present data so that it can be outputted in an arbitrary format, the accounting-document present data which has been given the predetermined data processing is stored as the output accounting-document data. Then, without giving a predetermined data processing to the accounting-document absent data so that it can be outputted in an arbitrary format, the stored output accounting-document data is updated based on the accounting-document absent data. Therefore, the time that is taken to process the accounting-document data becomes shorter than in the case where the predetermined data processing is conventionally given to all the accounting-document data so that it can be outputted in an arbitrary format, whether or not there is the accounting document.

These and other objects, features and advantages of the present invention will become more apparent upon reading of the following detailed description along with the accompanied drawings.

BRIEF DESCRIPTION OF THE DRAWINGS

FIG. 8 is a flow chart, showing electronic accounting-document processing by the electronic accounting-document system shown in FIG. 6.

FIGS. 9A and 9B are tables, showing an example of the accounting-document data to be created.

DETAILED DESCRIPTION OF INVENTION

Hereinafter, the electronic accounting-document system according to each embodiment of the present invention will be described with reference to the drawings.

First Embodiment

Figure 1:
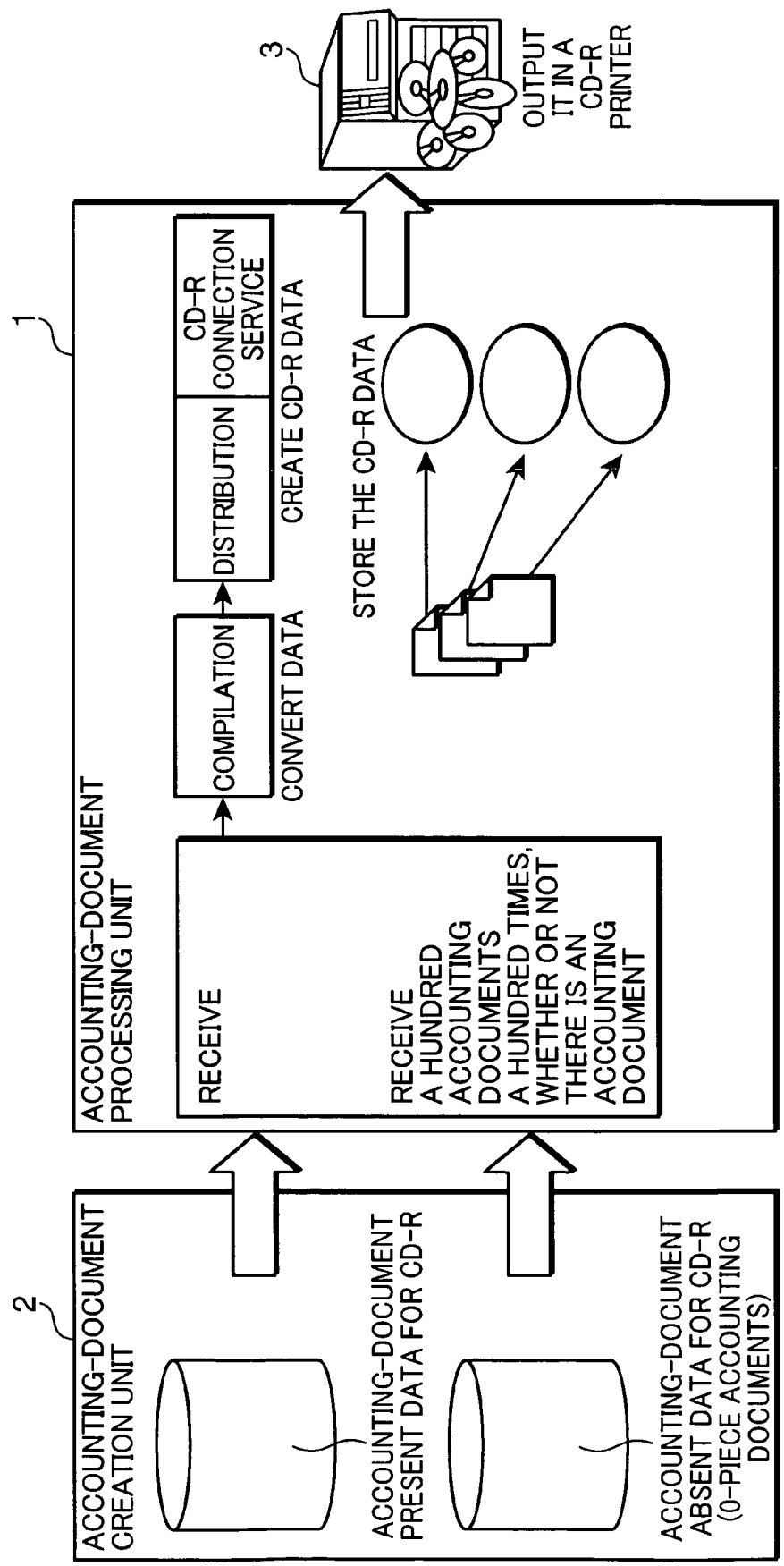
FIG. 1 is a representation, schematically showing processing by the electronic accounting-document system according to a first embodiment of the present invention.

FIG. 1 is a representation, schematically showing processing by the electronic accounting-document system according to a first embodiment of the present invention. The electronic accounting-document system is configured by an accounting-document processing unit 1, an accounting-document creation unit 2, and a CD-R creation unit 3. The accounting-document creation unit 2 accepts an input by a user and creates accounting-document data. From the accounting-document data which has been created by the accounting-document creation unit 2, the accounting-document processing unit 1 creates accounting-document data for recording in a CD-R. The CD-R creation unit 3 records it in the CD-R and outputs the CD-R in which the recording has been executed.

In a conventional electronic accounting-document system, whether accounting-document data is present or absent, the accounting-document creation unit 2 transmits it, and then, creates a CD-R. At that time, blank data is transmitted, even though it has no accounting-document data. Hence, the quantity of data is always the same, whether there is accounting-document data, or whether there is not. This increases the quantity of data which is received on the side of the accounting-document processing unit 1, thereby making the processing complicated.

Therefore, in the first embodiment, accounting-document data is split into accounting-document present data where accounting-document data exists and accounting-document absent data where no accounting-document data exists. Then, they are each transmitted to the accounting-document processing unit 1. At this time, the accounting-document absent data is given only identification information which shows there is no accounting-document data, and then, is transmitted.

Figure 2:
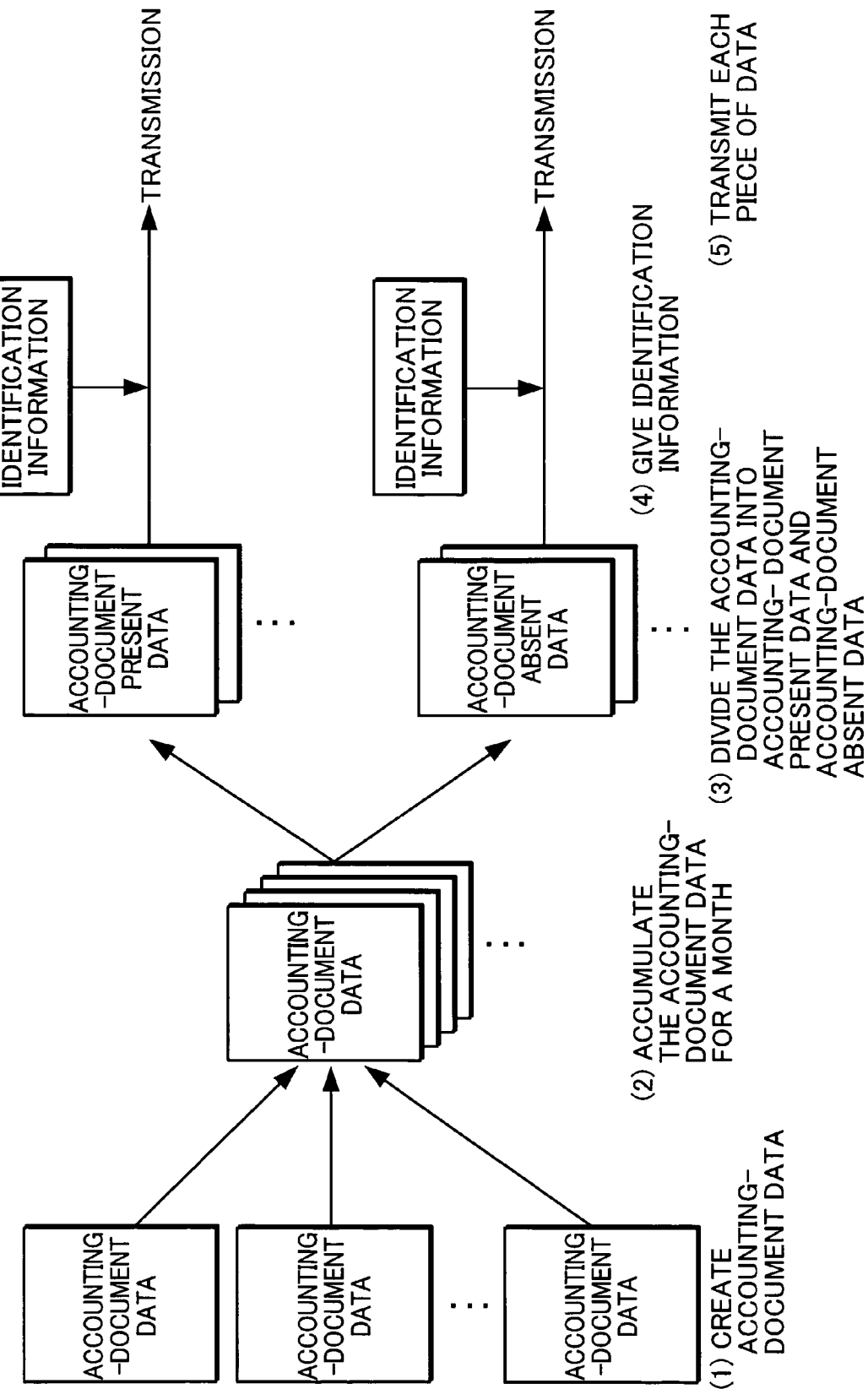
FIG. 2 is a typical representation, schematically showing the processing which is executed from the creation of accounting-document data to its transmission according to the first embodiment.

Herein, the processing will be described which is executed from the creation of accounting-document data to its transmission. FIG. 2 is a typical representation, schematically showing the processing which is executed from the creation of accounting-document data to its transmission according to the first embodiment. The processing shown in FIG. 2 the processing which is executed in the accounting-document creation unit 2. The processing in the accounting-document creation unit 2 is executed in the following order: (1) creating accounting-document data; (2) accumulating the accounting-document data; (3) dividing the accounting-document data; (4) giving identification information; and (5) transmitting accounting-document present data and accounting-document absent data.

First, an input of accounting-document data by a user is accepted, and then, accounting-document data is created. The created accounting-document data is accumulated in an accounting-document data storage section 204. When accounting-document data for a month is accumulated, it is split into accounting-document present data where accounting-document data exists and accounting-document absent data where no accounting-document data exists. Next, the accounting-document present data is given identification information which shows there is accounting-document data. On the other hand, the accounting-document absent data is given identification information which shows there is no accounting-document data. Sequentially, the accounting-document present data with the identification information and the accounting-document absent data with the identification information are transmitted to the accounting-document processing unit 1.

The accounting-document processing unit 1 receives the accounting-document present data and the accounting-document absent data which have been transmitted by the accounting-document creation unit 2. Then, it creates CD-R accounting-document data for storing the accounting-document present data in the CD-R.

Hence, in the first embodiment of the present invention, the accounting-document data which has been created by a user is divided into the accounting-document present data and the accounting-document absent data. Therefore, the time that is taken to transmit the accounting-document data becomes shorter than that in the case where the accounting-document data is conventionally transmitted, whether the accounting document exists or not.

Second Embodiment

Figure 3:
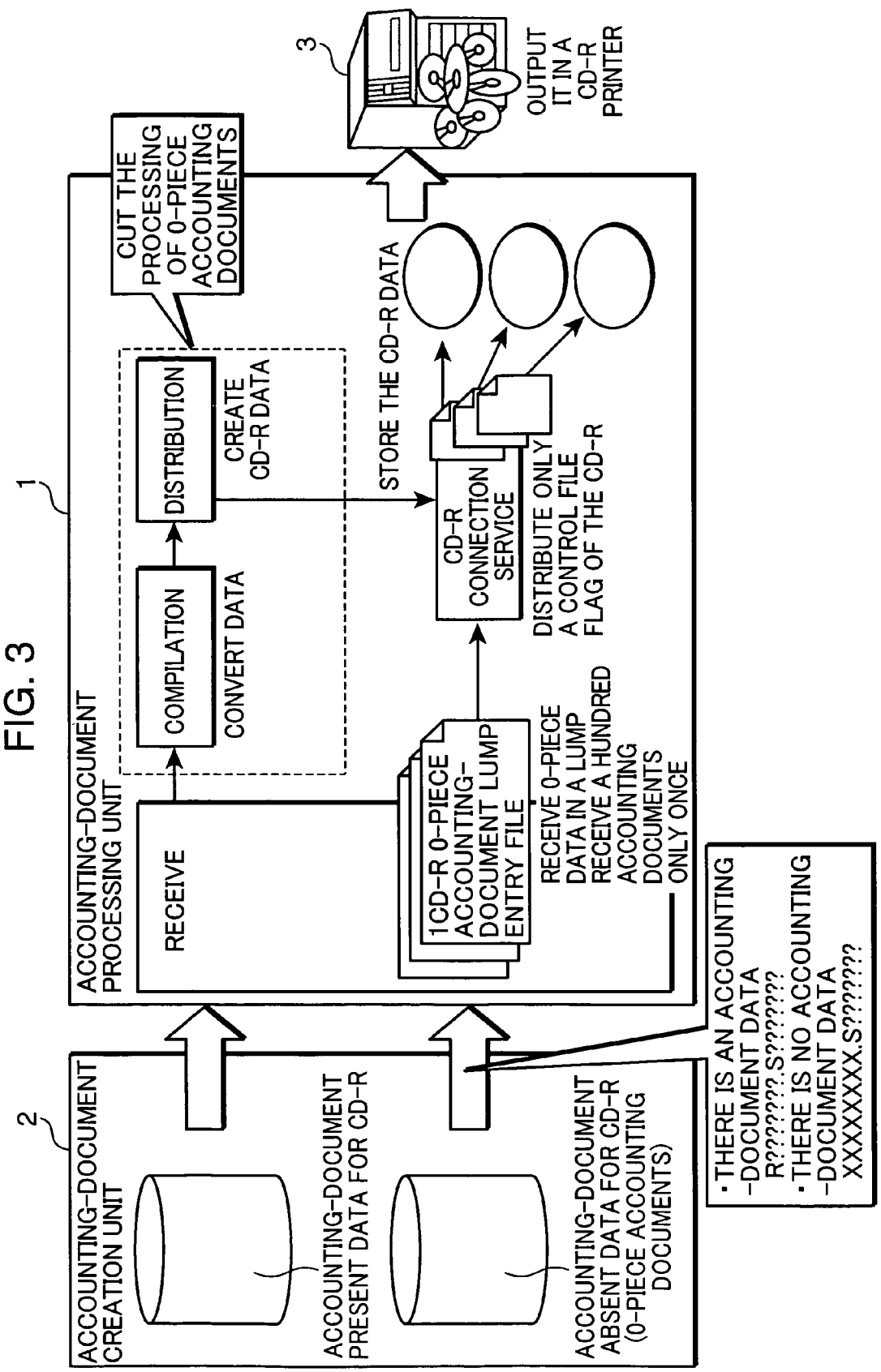
FIG. 3 is a representation, schematically showing processing by the electronic accounting-document system according to a second embodiment of the present invention.

Next, a second embodiment of the present invention will be described. FIG. 3 is a representation, schematically showing processing by the electronic accounting-document system according to a second embodiment of the present invention.

The electronic accounting-document system is configured by an accounting-document processing unit 1, an accounting-document creation unit 2, and a CD-R creation unit 3. The accounting-document creation unit 2 accepts an input by a user and creates accounting-document data. From the accounting-document data which has been created by the accounting-document creation unit 2, the accounting-document processing unit 1 creates accounting-document data for recording in a CD-R. The CD-R creation unit 3 records it in the CD-R and outputs the CD-R in which the recording has been executed.

In the above described electronic accounting-document system according to the first embodiment, the accounting-document data is transmitted after it has been divided into the accounting-document present data and the accounting-document absent data. In contrast, in the second embodiment, the accounting-document data is split into the accounting-document present data and the accounting-document absent data, and then, the plurality of pieces of accounting-document absent data which have been obtained by its division are transmitted in a lump to the accounting-document processing unit 1.

For example, assuming there are 100 pieces of accounting-document absent data, these 100 pieces of accounting-document absent data are transmitted together at a time. The accounting-document absent data is transmitted together with the identification information which shows there is no accounting-document data. Therefore, a single piece of accounting-document absent data has only a small quantity of data. This makes it possible to transmit the 100 pieces of accounting-document absent data all at once.

Figure 4:
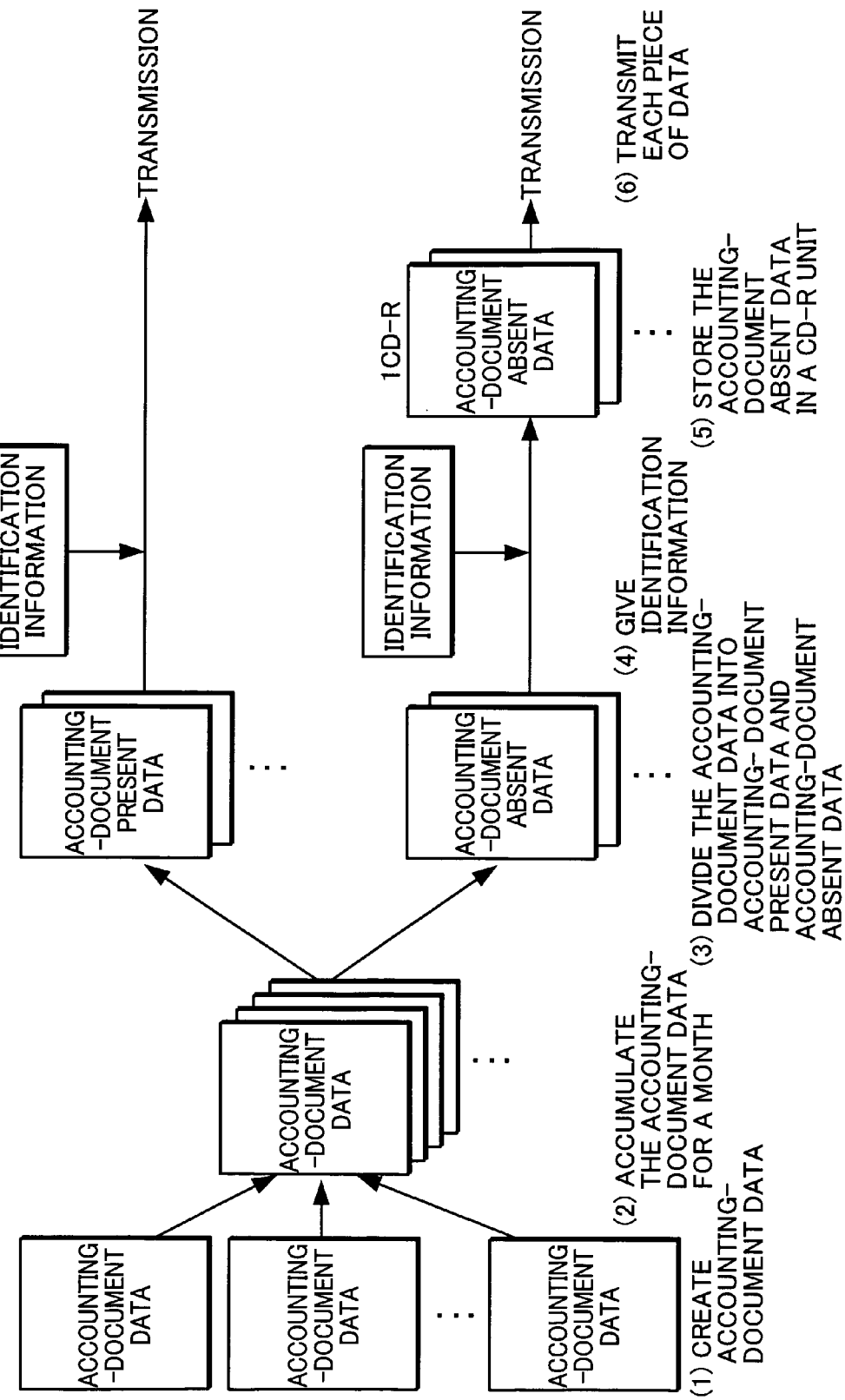
FIG. 4 is a typical representation, schematically showing the processing which is executed from the creation of accounting-document data to its transmission according to the second embodiment.

Herein, the processing will be described which is executed from the creation of accounting-document data to its transmission. FIG. 4 is a typical representation, schematically showing the processing which is executed from the creation of accounting-document data to its transmission according to the second embodiment. The processing shown in FIG. 4 the processing which is executed in the accounting-document creation unit 2. The processing in the accounting-document creation unit 2 is executed in the following order: (1) creating accounting-document data; (2) accumulating the accounting-document data; (3) dividing the accounting-document data; (4) giving identification information; (5) storing accounting-document absent data in a CD-R unit; and (6) transmitting accounting-document present data and accounting-document absent data.

First, an input of accounting-document data by a user is accepted, and then, accounting-document data is created. The created accounting-document data is accumulated in an accounting-document data storage section 204. When accounting-document data for a month is accumulated, it is split into accounting-document present data where accounting-document data exists and accounting-document absent data where no accounting-document data exists. Next, the accounting-document present data is given identification information which shows there is accounting-document data. On the other hand, the accounting-document absent data is given identification information which shows there is no accounting-document data. Sequentially, the accounting-document absent data with the identification information is stored in a CD-R unit. In other words, among the accounting documents which are stored in the single CD-R, the accounting documents which are 0 piece are once stored. Then, the accounting-document present data with the identification information is transmitted to the accounting-document processing unit 1. On the other hand, the pieces of accounting-document absent data which have been stored in a CD-R unit are transmitted in a lump to the accounting-document processing unit 1.

Figure 5:
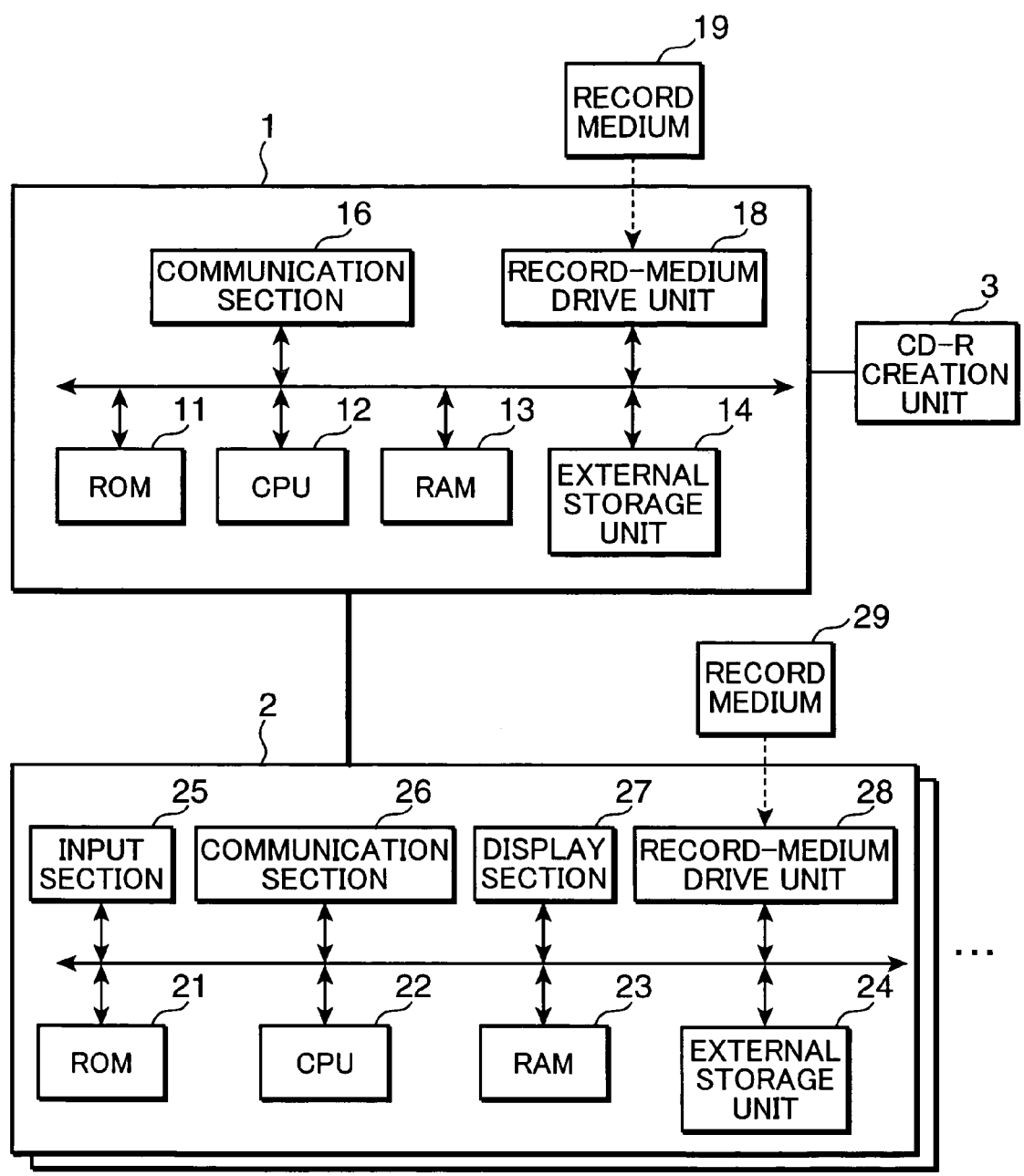
FIG. 5 is a representation, showing the entire configuration of the electronic accounting-document system according to an embodiment of the present invention.

FIG. 5 is a representation, showing the entire configuration of the electronic accounting-document system according to an embodiment of the present invention.

The electronic accounting-document system shown in FIG. 5 includes an accounting-document processing unit 1, a plurality of accounting-document creation units 2, and a CD-R creation unit 3. The accounting-document processing unit 1 and each accounting-document creation units 2 are connected through a cable which can be connected in a channel form. Herein, the accounting-document processing unit 1 and the accounting-document creation unit 2, and the accounting-document processing unit 1 and the CD-R creation unit 3, are each directly connected through a cable. However, the present invention is not limited especially to this. The accounting-document processing unit 1 and the accounting-document creation unit 2, and the accounting-document processing unit 1 and the CD-R creation unit 3, may also be connected, for example, via a network such as the Internet, so that they can communicate with each other.

Next, the accounting-document creation units 2 will be described in detail. Each accounting-document creation unit 2 is configured by an ordinary personal computer or the like. They each include: a ROM (or read only memory) 21; a CPU (or central processing unit) 22; a RAM (or random access memory) 23; an external storage unit 24; an input section 25; a communication section 26; a display section 27; and a record-medium drive unit 28.

The above described blocks in the accounting-document creation unit 2 are each connected to an internal bus. Via this bus, various kinds of data or the like is inputted and outputted inside of the accounting-document creation unit 2. Thus, various kinds of processing is executed under the control of the CPU 22.

In the ROM 21, there is stored in advance a basic program for operating the accounting-document creation unit 2, or the like. The RAM 23 is used as a work area of the CPU 22, or the like. A record medium 29 is a computer-readable record medium, and for example, it is configured by a CD-ROM. In this CD-ROM, there is stored an electronic accounting-document processing program on the side of a client which is used for a user to create an accounting document, or the like.

The record-medium drive unit 28 is configured by a CD-ROM drive or the like. Under the control of the CPU 22, it reads, from the record medium 29, the electronic accounting-document processing program on the client side, or the like. If necessary, the electronic accounting-document processing program on the client side or the like is installed in the external storage unit 24.

Herein, the record medium 29 is not limited especially to the above described example. If another record-medium drive unit is added, such as a DVD drive and a flexible disk drive, then using another computer-readable record-medium, such as a DVD and a flexible disk, the electronic accounting-document processing program on the client side or the like may also be installed in the external storage unit 24.

The external storage unit 24 is configured by an external storage unit such as a hard-disk drive. In the external storage unit 24, as described above, the electronic accounting-document processing program on the client side is installed.

The CPU 22 reads a basic program or the like from the ROM 21, and also reads the electronic accounting-document processing program on the client side or the like from the external storage unit 24. Thus, it executes an accounting-document creation processing for creating an accounting document, or the like. Using the communication section 26, it transmits and receives necessary data or the like to and from the accounting-document processing unit 1.

The input section 25 is configured by a keyboard, a mouse and the like. In it, there are inputted various commands or the like in response to an operation by a user. The communication section 26 controls its communication with the accounting-document processing unit 1 via a cable which is connected in a channel form. The display section 27 is configured by a CRT (or cathode-ray tube), a liquid-crystal display unit, or the like. Under the control of the CPU 22, it displays various screen images which are used in an accounting-document creation processing, using a static image or a dynamic image.

Next, the CD-R creation unit 3 will be described. The CD-R creation unit 3 writes, in a CD-R, accounting-document data which is transmitted from the accounting-document processing unit 1. Thereby, it creates the CD-R in which the accounting-document data is recorded. Herein, according to this embodiment, accounting-document data is recorded in a CD-R which is a writable record medium. However, the present invention is not limited especially to this. Another computer-readable record medium may also be used, such as CD-RW, a flexible disk, a DVD-RAM, a DVD-R, a DVD-RW and a DVD+RW which are repeatedly stored and erased.

Next, the accounting-document processing unit 1 will be described in detail. The accounting-document processing unit 1 is configured by an ordinary server unit or the like. It includes: a ROM 11; a CPU 12; a RAM 13; an external storage unit 14; a communication section 16; and a record-medium drive unit 18.

The above described blocks in the accounting-document processing unit 1 are each connected to an internal bus. Via this bus, various kinds of data or the like is inputted and outputted inside of the accounting-document processing unit 1. Thus, various kinds of processing is executed under the control of the CPU 12.

In the ROM 11, there is stored in advance a basic program for operating the accounting-document processing unit 1, or the like. The RAM 13 is used as a work area of the CPU 12, or the like. A record medium 19 is a computer-readable record medium, and for example, it is configured by a CD-ROM. In this CD-ROM, there is stored an electronic accounting-document processing program for recording accounting-document data in a record medium.

The record-medium drive unit 18 is configured by a CD-ROM drive or the like. Under the control of the CPU 12, it reads, from the record medium 19, the electronic accounting-document processing program, or the like. If necessary, the electronic accounting-document processing program or the like is installed in the external storage unit 14.

Herein, the record medium 19 is not limited especially to the above described example. If another record-medium drive unit is added, such as a DVD drive and a flexible disk drive, then using another computer-readable record-medium, such as a DVD and a flexible disk, the electronic accounting-document processing program or the like may also be installed in the external storage unit 14.

The external storage unit 14 is configured by an external storage unit such as a hard-disk drive. In the external storage unit 14, as described above, the electronic accounting-document processing program is installed.

The CPU 12 reads a basic program or the like from the ROM 11, and also reads the electronic accounting-document processing program or the like from the external storage unit 14. Thus, it executes a data processing for recording, in a CD-R, accounting-document data which is transmitted from the accounting-document creation unit 2, or the like. Using the communication section 16, it transmits and receives necessary data or the like to and from the accounting-document creation unit 2 and the CD-R creation unit 3.

Figure 6:
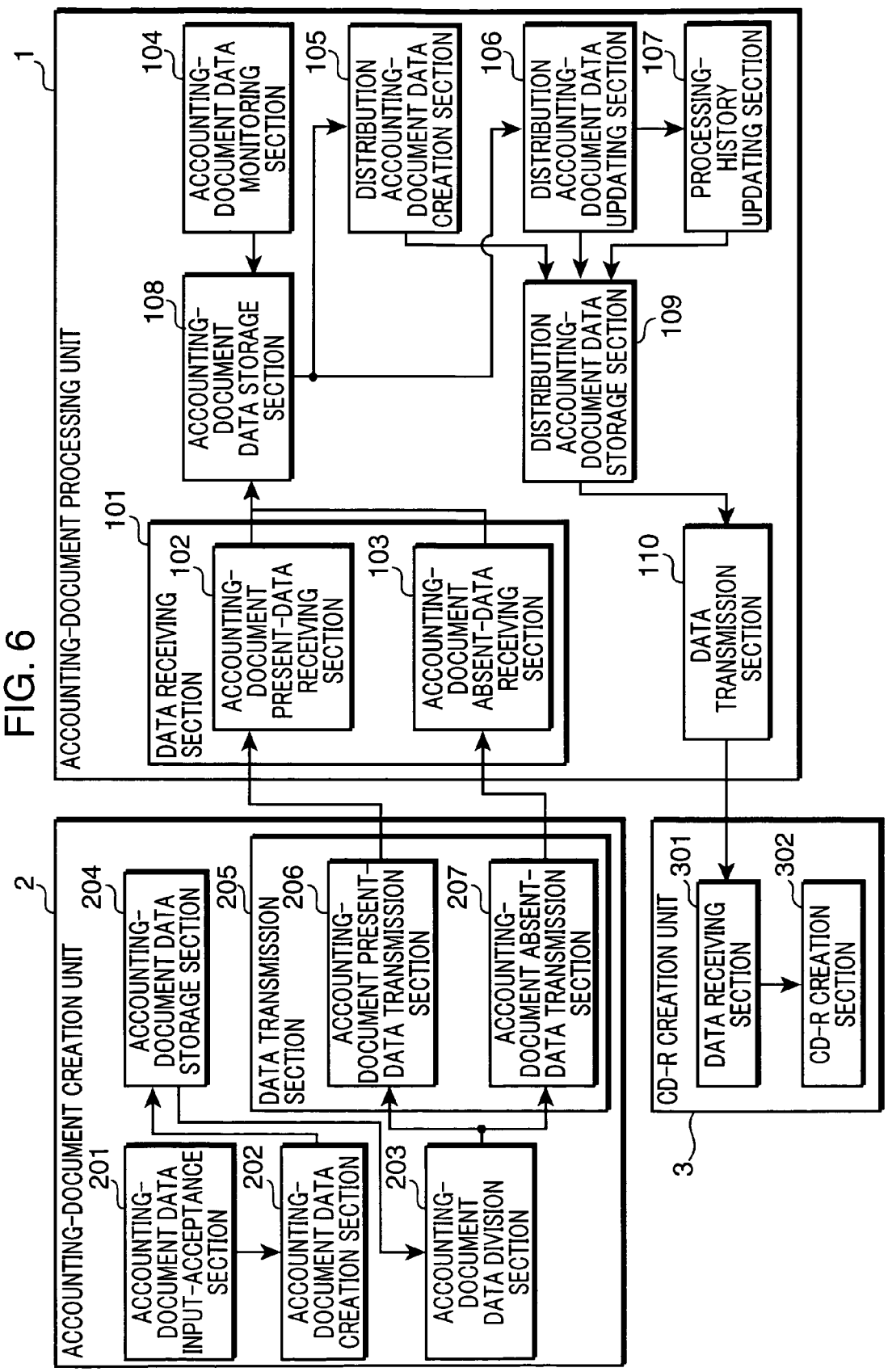
FIG. 6 is a block diagram, showing the main functions of the electronic accounting-document system shown in FIG. 5.

Next, the main functions of an electronic accounting-document system will be described. FIG. 6 is a block diagram, showing the main functions of the electronic accounting-document system shown in FIG. 5. The electronic accounting-document system shown in FIG. 6 includes an accounting-document processing unit 1, an accounting-document creation unit 2, and a CD-R creation unit 3.

The accounting-document creation unit 2 is configured by: an accounting-document data input-acceptance section 201; an accounting-document data creation section 202; an accounting-document data division section 203; an accounting-document data storage section 204; and a data transmission section 205.

The accounting-document data input-acceptance section 201 is configured, for example, by an input section 25, a display section 27, and the like. It displays accounting-document items in the display section 27, and according to the displayed accounting-document items, it accepts an input of accounting-document data by a user.

Herein, it is preferable that the accounting document in this embodiment be an accounting document which is prescribed in "the electronic accounts storage law (i.e., a law which relates to a special case, such as how to store national tax-related accounting documents which are created using a computer)". As such a statutory accounting document, there is, for example, an accounting document in an account department, an accounting document in a sales department, or the like. In addition, as an accounting document in an account department, there is an accounting document which relates to money itself, funds management, fixed assets, account settlement, credit management, merchandise accounts, material-cost management, repair-parts accounts, exports distribution accounts, and the like. Besides, as an accounting document in a sales department, there is an accounting document which relates to sales, a delivery date, a delivered product, and the like.

The accounting-document data creation section 202 is configured, for example, by a CPU 22. It creates accounting-document data which is accepted by the accounting-document data input-acceptance section 201.

The accounting-document data storage section 204 is configured, for example, by an external storage unit 24. It stores accounting-document data which is created by the accounting-document data creation section 202. Accounting-document data is stored, for example, in a unit of each corporate department in a single record medium. Besides, the name of an accounting document and the number of pages correspond to each company department.

The accounting-document data division section 203 is configured, for example, by the CPU 22. It reads the accounting-document data which is stored in the accounting-document data storage section 204. It splits the read accounting-document data into accounting-document present data which has the accounting-document data and accounting-document absent data which does not have the accounting-document data. In addition, the accounting-document data division section 203 gives identification information for identifying the accounting-document present data and identification information for identifying the accounting-document absent data.

Figure 7:
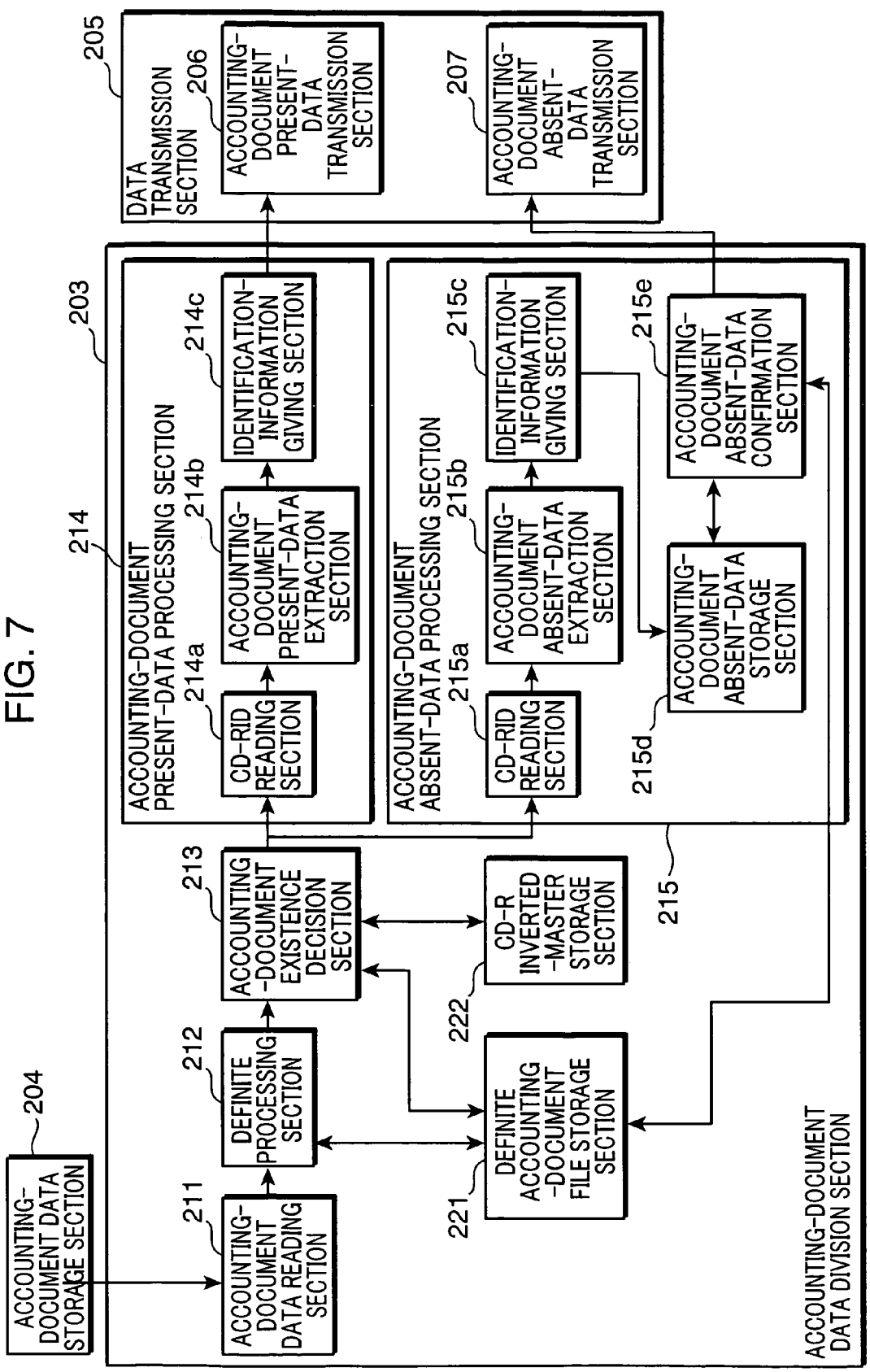
FIG. 7 is a block diagram, specifically showing the configuration of an accounting-document data division section shown in FIG. 6.

FIG. 7 is a block diagram, specifically showing the configuration of the accounting-document data division section 203 shown in FIG. 6. The accounting-document data division section 203 shown in FIG. 7 is configured by: an accounting-document data reading section 211; a definite processing section 212; an accounting-document existence decision section 213; an accounting-document present-data processing section 214; an accounting-document absent-data processing section 215; a definite accounting-document file storage section 221; and a CD-R inverted-master storage section 222.

The accounting-document data reading section 211 reads the accounting-document data which is stored in the accounting-document data storage section 204.

The definite processing section 212 displays, in a display section 27, the accounting-document data which is read by the accounting-document data reading section 211. Then, the definite processing section 212 accepts, from an input section 25, whether a CD-R should be created using the displayed accounting-document data. If the accounting-document data which is stored in the CD-R becomes definite, the definite processing section 212 stores it as the definite accounting-document file in the definite accounting-document file storage section 221. In addition, in the CD-R inverted-master storage section 222, master information is entered which includes all accounting-document IDs for each CD-R. Herein, the master information will be described later.

The accounting-document existence decision section 213 reads the definite accounting-document file which is stored in the definite accounting-document file storage section 221. In addition, it reads a CD-R inverted master which is stored in the CD-R inverted-master storage section 222. Then, based on the read CD-R inverted master, the accounting-document existence decision section 213 decides whether or not the read definite accounting-document file is the accounting-document absent data.

If the accounting-document existence decision section 213 decides that it is not the accounting-document absent data, in other words, it is the accounting-document present data, then the accounting-document present-data processing section 214 extracts the accounting-document present data. It is configured by a CD-RID reading section 214a, an accounting-document present-data extraction section 214b, and an identification-information giving section 214c.

The CD-RID reading section 214a reads a CD-RID from the accounting-document present data. Then, it decides whether or not the read CD-RID is the CD-RID which is processed (i.e. whose CD-R is created) for a certain month.

If the CD-RID which is read by the CD-RID reading section 214a is the CD-RID which is processed for a certain month, the accounting-document present-data extraction section 214b extracts the accounting-document present data from the definite accounting-document file storage section 221.

The identification-information giving section 214c gives identification information which shows there is accounting-document data to the accounting-document present data which is extracted by the accounting-document present-data extraction section 214b. Then, the accounting-document present data which is given the identification information by the identification-information giving section 214c is outputted to an accounting-document present-data transmission section 206 of the data transmission section 205.

If the accounting-document existence decision section 213 decides that it is the accounting-document absent data, the accounting-document absent-data processing section 215 extracts the accounting-document absent data. It is configured by a CD-RID reading section 215a; an accounting-document absent-data extraction section 215b; an identification-information giving section 215c; an accounting-document absent-data storage section 215d; and an accounting-document absent-data confirmation section 215e.

The CD-RID reading section 215a reads a CD-RID from the accounting-document absent data. Then, it decides whether or not the read CD-RID is the CD-RID which is processed (i.e. whose CD-R is created) for a certain month.

If the CD-RID which is read by the CD-RID reading section 215a is the CD-RID which is processed for a certain month, the accounting-document absent-data extraction section 215b extracts the accounting-document absent data from the definite accounting-document file storage section 221.

The identification-information giving section 215c gives identification information which shows there is no accounting-document data to the accounting-document absent data which is extracted by the accounting-document absent-data extraction section 215b. Then, the accounting-document absent data which is given the identification information by the identification-information giving section 215c is stored in the accounting-document absent-data storage section 215d.

The accounting-document absent-data storage section 215d stores, in a CD-R unit, the accounting-document absent data which is given the identification information by the identification-information giving section 215c.

The accounting-document absent-data confirmation section 215e confirms the accounting-document absent data which is stored in the accounting-document absent-data storage section 215d. If the accounting-document absent data for one CD-R is stored in the accounting-document absent-data storage section 215d, it reads the one-CD-R accounting-document absent data at a time, and outputs it to an accounting-document absent-data transmission section 207. Herein, the accounting-document absent-data confirmation section 215e refers to the CD-RID of the accounting-document absent data for one CD-R which is stored in the definite accounting-document file storage section 221. Then, it decides whether or not all the CD-RID of the accounting-document absent data for one CD-R has been stored in the accounting-document absent-data storage section 215d. If it decides that the accounting-document absent data for one CD-R has been stored, then it reads, together at a time, the accounting-document absent data for one CD-R. Then, it outputs it to the accounting-document absent-data transmission section 207.

Moving back to FIG. 6, the data transmission section 205 is configured, for example, by the communication section 26, and transmits accounting-document data. The data transmission section 205 is provided with the accounting-document present-data transmission section 206 and the accounting-document absent-data transmission section 207. The accounting-document present-data transmission section 206 transmits, to the accounting-document processing unit 1, the accounting-document present data which is divided by the accounting-document data division section 203. The accounting-document absent-data transmission section 207 transmits the accounting-document absent data, in a lump, to the accounting-document processing unit 1.

Herein, in this embodiment, first, accounting-document absent-data transmission section 207 transmits the accounting-document absent data, together at a time, to the accounting-document processing unit 1. Sequentially, the accounting-document present-data transmission section 206 transmits the accounting-document present data to the accounting-document processing unit 1. However, the present invention is not limited especially to this. Alternatively, first, the accounting-document present-data transmission section 206 transmits the accounting-document present data to the accounting-document processing unit 1, and finally, the accounting-document absent-data transmission section 207 transmits the accounting-document absent data, together at a time, to the accounting-document processing unit 1.

In addition, the accounting-document creation unit 2 according to this embodiment sends the accounting-document absent data into the accounting-document processing unit 1. Thereafter, it sends the accounting-document present data into the accounting-document processing unit 1. At this time, the accounting-document creation unit 2 sends the accounting-document absent data or the accounting-document present data in the order where the accounting documents are stored for each CD-RID. The accounting-document processing unit 1 processes the accounting-document present data and the accounting-document absent data which have been sent in from the accounting-document creation unit 2, in alphabetical (i.e. A to Z) order of accounting-document names, whether or not there is accounting-document data.

Herein, in this embodiment, the accounting-document present data and the accounting-document absent data are processed in alphabetical order. However, the present invention is not limited especially to this. The accounting-document present data and the accounting-document absent data may also be processed, without being distinguished, in the order where they are sent in (i.e. in the order where they are received) from the accounting-document creation unit 2. In that case, there is no need to consider, particularly, the timing or order in which the accounting-document present data and the accounting-document absent data are sent in.

The accounting-document processing unit 1 is configured by including: a data receiving section 101; an accounting-document data monitoring section 104; a distribution accounting-document data creation section 105; a distribution accounting-document data updating section 106; a processing-history updating section 107; an accounting-document data storage section 108; a distribution accounting-document data storage section 109; and a data transmission section 110.

The data receiving section 101 is configured, for example, by the communication section 16, and is provided with an accounting-document present-data receiving section 102 and an accounting-document absent-data receiving section 103. The accounting-document present-data receiving section 102 receives the accounting-document present data which is transmitted from the accounting-document present-data transmission section 206 of the accounting-document creation unit 2. The accounting-document absent-data receiving section 103 receives the accounting-document absent data which is transmitted from the accounting-document absent-data transmission section 207 of the accounting-document creation unit 2.

The accounting-document data storage section 108 is configured, for example, by the external storage unit 14. It stores the accounting-document data which is received by the data receiving section 101.

The accounting-document data monitoring section 104 is configured, for example, by the CPU 12. It decides whether the accounting-document data which is received by the data receiving section 101 and is stored in the accounting-document data storage section 108 is the accounting-document present data or the accounting-document absent data. At this time, based on the identification information which is given by the accounting-document data division section 203, the accounting-document data monitoring section 104 distinguishes between the accounting-document present data and the accounting-document absent data.

The distribution accounting-document data creation section 105 is configured, for example, by the CPU 12. It compiles the accounting-document present data which is obtained by the decision of the accounting-document data monitoring section 104, so that it can be processed in the accounting-document processing unit 1. Then, it creates accounting-document data for distribution which is distributed to the CD-R creation unit 3. Next, it stores the created distribution accounting-document data in the distribution accounting-document data storage section 109.

The distribution accounting-document data updating section 106 is configured, for example, by the CPU 12. Based on the accounting-document absent data which is obtained by the decision of the accounting-document data monitoring section 104, it updates the distribution accounting-document data which is stored in the distribution accounting-document data storage section 109.

The processing-history updating section 107 is configured, for example, by the CPU 12. It updates the processing history of the distribution accounting-document data which is stored in the distribution accounting-document data storage section 109. Specifically, when processing starts for an accounting document, the processing-history updating section 107 changes the flag of the distribution accounting-document data from "0" which shows that it is not yet processed to "1" which shows that the accounting document is now processed. When the accounting-document processing is completed, it changes the flag from "1" to "3" which shows that the processing is completed. Thereby, it updates the processing history of the distribution accounting-document data.

The data transmission section 110 is configured, for example, by the communication section 16. It reads, from the distribution accounting-document data storage section 109, the distribution accounting-document data whose processing history is updated by the processing-history updating section 107. Then, it transmits the read distribution accounting-document data to a data receiving section 301 of the CD-R creation unit 3.

The CD-R creation unit 3 is configured by including the data receiving section 301 and a CD-R creation section 302. The data receiving section 301 receives the distribution accounting-document data which is transmitted by the data transmission section 110 of the accounting-document processing unit 1. The CD-R creation section 302 records, in a CD-R, the distribution accounting-document data which is received by the data receiving section 301. Thereby, it creates the CD-R in which the accounting-document data is recorded.

Next, electronic accounting-document processing will be described which is executed by the electronic accounting-document system shown in FIG. 6. FIG. 8 is a flow chart, showing electronic accounting-document processing by the electronic accounting-document system shown in FIG. 6.

In a step S1, the accounting-document data input-acceptance section 201 accepts an input of accounting-document data by a user. Specifically, the accounting-document data input-acceptance section 201 displays, in the display section 27, an accounting-document item whose input is desired by the user. According to the displayed accounting-document items, it accepts the input of the accounting-document data by the user. The user inputs it using the input section 25.

In a step S2, the accounting-document data creation section 202 creates the accounting-document data whose input is accepted by the accounting-document data input-acceptance section 201. The accounting-document data which is created by the accounting-document data creation section 202 is stored in the accounting-document data storage section 204.

FIGS. 9A and 9B are tables, showing an example of the accounting-document data to be created. The accounting-document data in this embodiment is recorded for each corporate department in a single CD-R. Therefore, as a created CD-R unit example 401 shown in FIGS. 9A and 9B, there are credit management/product-merchandise accounts 501 in an A_department, material/cost management 502 in a B_department, exports sales accounts 503 in a C_department, and the like. In an accounting-document name example 402, there are shown an example of the accounting-document names which correspond to the credit management/product-merchandise accounts 501 in the A_department, the material/cost management 502 in the B_department and the exports sales accounts 503 in the C_department. For example, to the credit management/product-merchandise accounts 501 in the A_department, an accounting-document corresponds, such as a "term-end NO1 corporeal fixed-assets movement overall-list J", an "SDP merchandise ledger", a "merchandise ledger", an "SDP inventory daily bulletin", and the like; to the material/cost management 502 in the B_department, a "half-finished product inventory/transfer proof-list", an "manufacturing-inventory record proof-list", and the like; and to the exports sales accounts 503 in the C_department, "cash-flow estimates", and the like. A page number 403 shows the number of pages of each accounting document. For example, the "term-end NO1 corporeal fixed-assets movement overall-list J" has no accounting document, and thus, the page number 403 is "0". The accounting document of the "merchandise ledger" has 200 pages, and thus, the page number 403 is "200".

In a conventional electronic accounting-document system, an accounting-document creation unit transmits, an accounting-document processing unit, a so-called 0-piece accounting-document data which does not include any accounting-document data, in the same way as in the case where there is accounting-document data. Hence, such accounting-document data is transmitted without any accounting-document data, thereby taking a lot of time. In contrast, in the electronic accounting-document system according to the present invention, the 0-piece accounting-document data which does not include any accounting-document data is transmitted at a time for each CD-R. This shortens the time required for its transmission. For example, the 0-piece accounting-document data is transmitted in a lump, such as the "term-end NO1 corporeal fixed-assets movement overall-list J", the "SDP merchandise ledger" and an "SDP merchandise ledger (for each base place)" which are shown FIG. 9A.

Returning to FIG. 8, in a step S3, the data transmission section 205 decides whether or not accounting-document data should be transmitted to the accounting-document processing unit 1. If it decides that the accounting-document data should be transmitted to the accounting-document processing unit 1 (YES at the step S3), the processing shifts to a step S4. On the other hand, if it decides that the accounting-document data should not be transmitted to the accounting-document processing unit 1 (NO at the step S3), the processing moves back to the step S1. Then, an input of accounting-document data is again accepted.

In the step S4, the accounting-document data division section 203 executes an accounting-document data splitting processing for dividing the accounting-document data which is stored in the accounting-document data storage section 204 into accounting-document present data which has the accounting-document data and accounting-document absent data which does not have the accounting-document data. Herein, the accounting-document absent data in which there is no accounting-document data is equivalent to the accounting-document data whose page number is 0, as shown in FIGS. 9A and 9B. On the other hand, the accounting-document present data in which there is accounting-document data is equivalent to the accounting-document data whose page number is 1 or more, as shown in FIGS. 9A and 9B.

Figure 10:
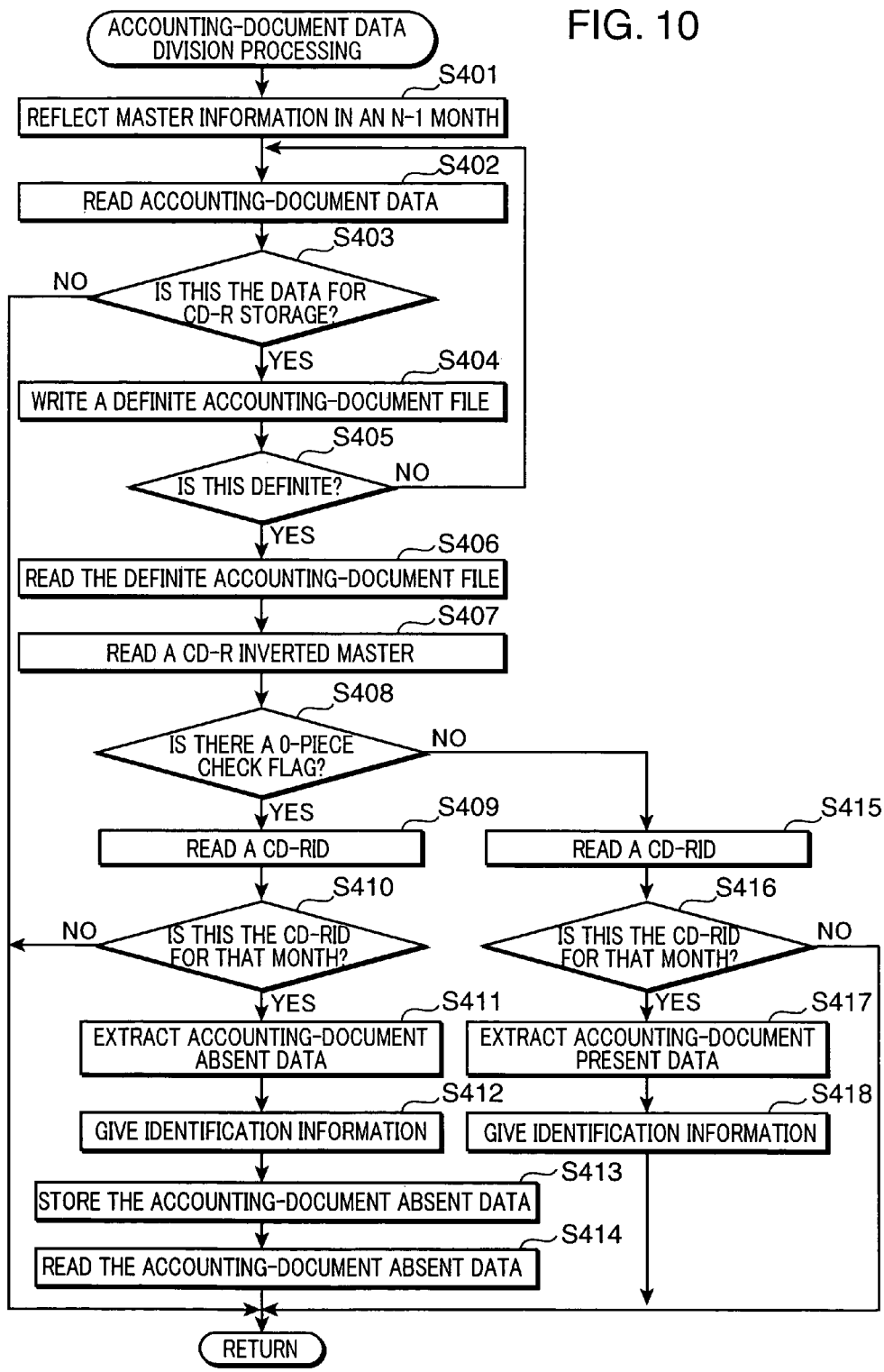
FIG. 10 is a flow chart, showing the processing of dividing accounting-document data in the step S4 of FIG. 8.

FIG. 10 is a flow chart, showing the processing of dividing accounting-document data in the step S4 of FIG. 8.

First, in a step S401, the accounting-document data division section 203 reflects, in the accounting-document data, master information in an N−1 month which is processed in an N month. For example, in this embodiment, in an N month, the accounting-document data in an N−1 month is recorded in a CD-R. The master information is recorded, for example, in the external storage unit 24. As the master information in this embodiment, there are: an accounting-document attribute master which manages an accounting-document attribute; an accounting-document distribution-destination master which manages the distribution-destination attribute of an accounting document; a distribution-destination name master which manages the name of a distribution destination and the distribution destination; a CD-R label master which manages the label information of a CD-R; a user ID master which manages security for a user; a CD-R storage exclusion master which manages the exclusion of the storage into a CD-R; and the like.

The accounting-document attribute master manages: an accounting-document ID; an effectuation date; an accounting-document name; a money-levying code; a business code; a management level; an updating cycle; the number of the largest generation; the number of a relative generation; an overlaid name; a format name; a fixed-name code; the code of certain hours in a day; a storage grouping; and the like.

The accounting-document distribution-destination master manages: an accounting-document ID; an effectuation date; a cycle ID; a distribution-destination code; a pass code; a CD-RID; an effectuation month; a 0-piece check grouping (or a 0-piece check flag); a distribution destination; and the like.

The distribution-destination name master manages: a distribution-destination code; a distribution-destination name; a distribution destination; and the like.

The CD-R label master manages: a CD-RID; a CD-R name; a label name; a business name; a company name; a department code; a department name; a section name; an address; a telephone number; the number of the original texts; the number of duplicate copies; the name of the original; the name of the duplicate; a zip code; a note; and the like.

The user ID master manages: a user ID; a user name; a password; a distribution-destination code; security for searching a table of contents; a note; a management level; and the like.

The CD-R storage exclusion master manages: a CD-RID; a CD-R storage exclusion flag; and the like.

These pieces of master information are entered by a person in charge of an application system, and then, they are unified and managed. In other words, the master information which is entered or changed in the accounting-document creation unit 2 is reflected, in a batch processing, in the master information which is stored in the accounting-document processing unit 1. In the same way, the master information which is entered or changed in the accounting-document processing unit 1 is reflected, in a batch processing, in the master information which is stored in the accounting-document creation unit 2.

Next, in a step S402, the accounting-document data reading section 211 reads the accounting-document data which is stored in the accounting-document data storage section 204.

Next, in a step S403, the accounting-document data reading section 211 decides whether or not the accounting-document data is data to be stored in a CD-R. At this time, based on a cycle ID which is included in the master information, the accounting-document data reading section 211 decides whether or not the accounting-document data is the data to be stored in the CD-R. This cycle ID is used to identify the distribution destination of the accounting-document data. It is determined whether it should be stored in the CD-R, in an ordinary server, or in a server for backup. For example, if the cycle ID=10, the processing of storing it in the CD-R is executed. On the other hand, if the cycle ID=99, the processing of storing it in the ordinary server or in the server for backup is executed. Herein, if it is judged to be the data to be stored in the CD-R (YES at the step S403), the processing shifts to a step S404. In contrast, if it is judged to be the data not to be stored in the CD-R (NO at the step S403), the processing for dividing the accounting-document data is terminated.

If the accounting-document data is judged to be the data to be stored in the CD-R, then in the step S404, the definite processing section 212 writes, as a definite accounting-document file, the read accounting-document data in the definite accounting-document file storage section 221. In the definite accounting-document file, information is stored on the storage date and time, and the like, of the accounting document which is stored for each CD-R.

Next, in a step S405, the definite processing section 212 displays the definite accounting-document file, and accepts a definite instruction by a user. If the user wants the contents of the displayed definite accounting-document file, the user inputs the definite instruction using the input section 25. If the decision is made that the contents of the definite accounting-document file become definite (YES at the step S405), the processing moves ahead to a step S406. On the other hand, if the decision is made that the contents of the definite accounting-document file do not become definite (NO at the step S405), the processing moves back to the step S402.

Herein, in this embodiment, the definite processing section 212 displays the definite accounting-document file, and accepts a definite instruction by a user. However, the present invention is not limited especially to this. The definite processing section 212 may also automatically make its contents definite.

If the decision is made that the contents of the definite accounting-document file become definite, then in the step S406, the accounting-document existence decision section 213 reads the definite accounting-document file which is stored in the definite accounting-document file storage section 221. Herein, the definite accounting-document file which is read here is read in a CD-R unit.

Next, in a step S407, the accounting-document existence decision section 213 reads a CD-R inverted master from the CD-R inverted-master storage section 222. In the CD-R inverted master, master information is entered which includes all accounting-document IDs for each CD-R.

Next, in a step S408, the accounting-document existence decision section 213 decides whether or not there is a 0-piece check flag in the read CD-R inverted master. If the decision is made that there is a 0-piece check flag (YES at the step S408), the processing moves ahead to a step S409. On the other hand, if the decision is made that there is no 0-piece check flag (NO at the step S408), the processing shifts to a step S413.

If the decision is made that there is a 0-piece check flag, then in the step S409, the CD-RID reading section 215a reads, from a database, CD-RID information for identifying a CD-R which is created this month.

Next, in a step S410, the accounting-document absent-data extraction section 215b decides whether or not the read CD-RID is the CD-RID which is processed in a certain month. If the decision is made that the read CD-RID is the CD-RID which is processed in that month (YES at the step S410), the processing moves ahead to a step S411. On the other hand, if the decision is made that the read CD-RID is not the CD-RID which is processed in that month (NO at the step S411), the processing for dividing the accounting-document data is terminated.

If the decision is made that the read CD-RID is the CD-RID which is processed in that month, then in the step S411, the accounting-document absent-data extraction section 215b extracts the accounting-document absent data.

Next, in a step S412, the identification-information giving section 215c gives identification information which shows there is no accounting-document data to the accounting-document absent data which is extracted by the accounting-document absent-data extraction section 215b. In this embodiment, as the identification information for identifying the accounting-document absent data, the file name of the accounting-document absent data is set to "XXXXXXXX.S00000??". Herein, any numeral is entered in the "?" of this file name.

Next, in a step S413, the accounting-document absent-data storage section 215d stores the accounting-document absent data which is given the identification information by the identification-information giving section 215c. Then, the accounting-document absent data which is given the identification information is stored in a CD-R unit.

Next, in a step S414, the accounting-document absent-data confirmation section 215e confirms the accounting-document absent data which is stored in the accounting-document absent-data storage section 215d. If all the accounting-document absent data which is stored in a single CD-R is stored in the accounting-document absent-data storage section 215d, it reads the accounting-document absent data in a batch in a CD-R unit. Then, it outputs it to the accounting-document absent-data transmission section 207. The accounting-document absent-data transmission section 207 transmits, in a batch in a CD-R unit, the accounting-document absent data which is inputted from the accounting-document absent-data confirmation section 215e.

On the other hand, if the decision is made that there is no 0-piece check flag, then in a step S415, the CD-RID reading section 214a reads, from a database, CD-RID information for identifying a CD-R which is created this month.

Next, in a step S416, the accounting-document present-data extraction section 214b decides whether or not the read CD-RID is the CD-RID which is processed in a certain month. If the decision is made that the read CD-RID is the CD-RID which is processed in that month (YES at the step S416), the processing moves ahead to a step S417. On the other hand, if the decision is made that the read CD-RID is not the CD-RID which is processed in that month (NO at the step S416), the processing for dividing the accounting-document data is terminated.

If the decision is made that the read CD-RID is the CD-RD which is processed in that month, then in the step S417, the accounting-document present-data extraction section 214b extracts the accounting-document present data.

Next, in a step S418, the identification-information giving section 214c gives identification information which shows there is an accounting-document data to the accounting-document present data which is extracted by the accounting-document present-data extraction section 214b. The accounting-document present data which is given the identification information is outputted, one piece after another, to the accounting-document present-data transmission section 206. Then, the accounting-document present-data transmission section 206 transmits, one by one, the accounting-document present data. In this embodiment, as the identification information for identifying the accounting-document present data, the file name of the accounting-document present data is set to "R???????. S???????". Herein, any numeral is entered in the "?" of this file name.

As described above, the accounting-document data division section 203 extracts the accounting-document absent data, based on the read definite accounting-document information file, CD-R inverted master and CD-RID.

Figure 11:
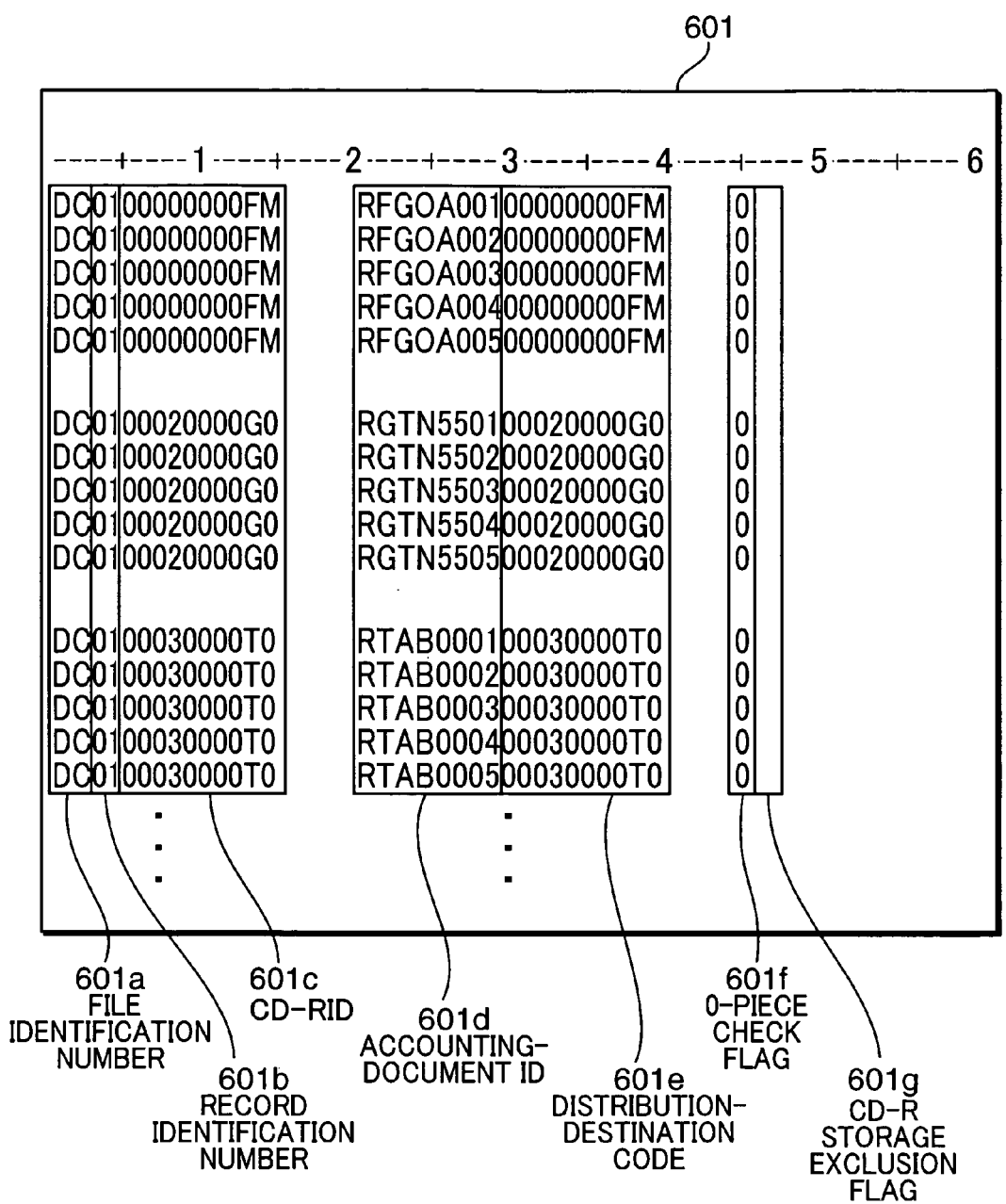
FIG. 11 is a table, showing an example of the file layout of a CD-R inverted master.
Figure 12:
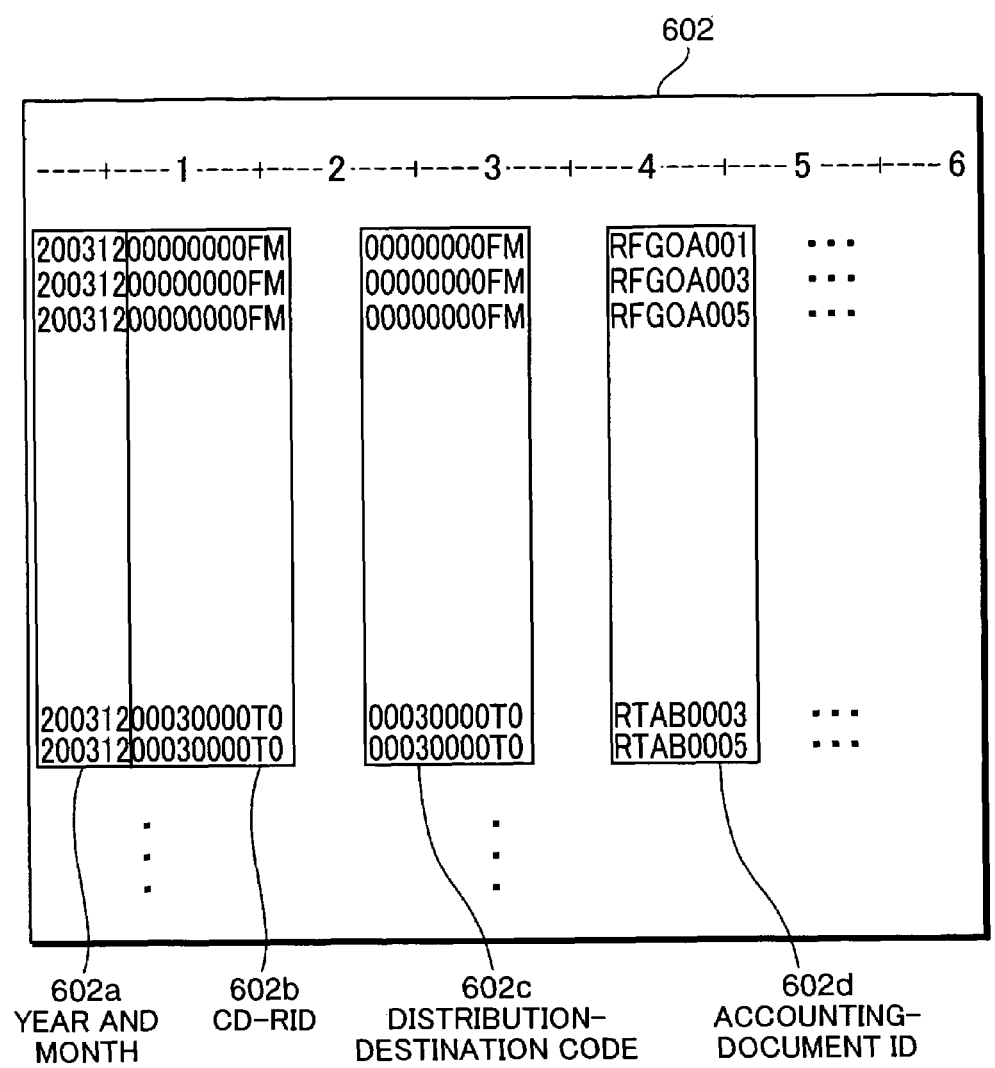
FIG. 12 is a table, showing an example of the file layout of a definite accounting-document information file.
Figure 13:
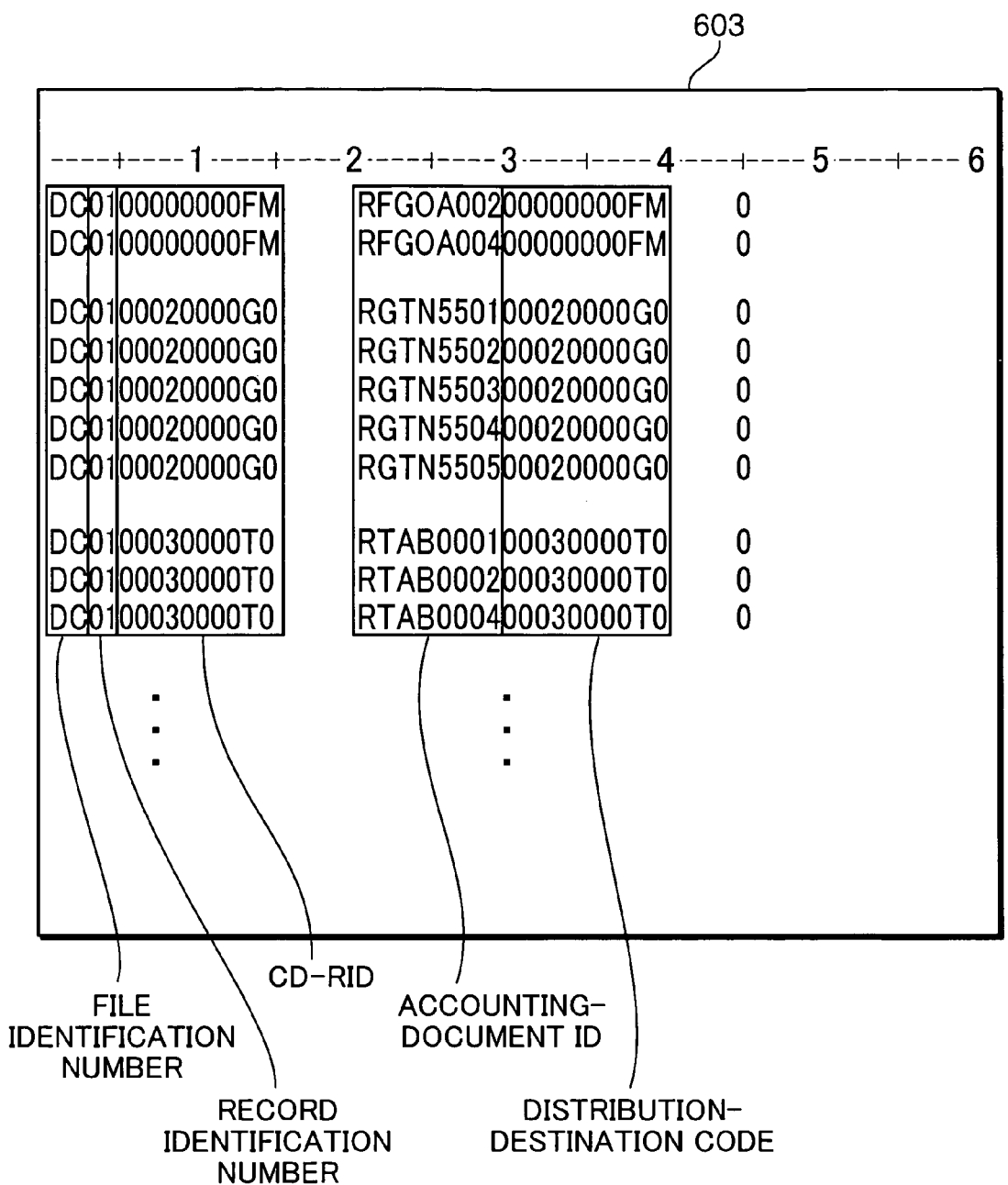
FIG. 13 is a table, showing an example of accounting-document absent data which is extracted from the CD-R inverted master in FIG. 11 and the definite accounting-document information file in FIG. 12.
Figure 14:
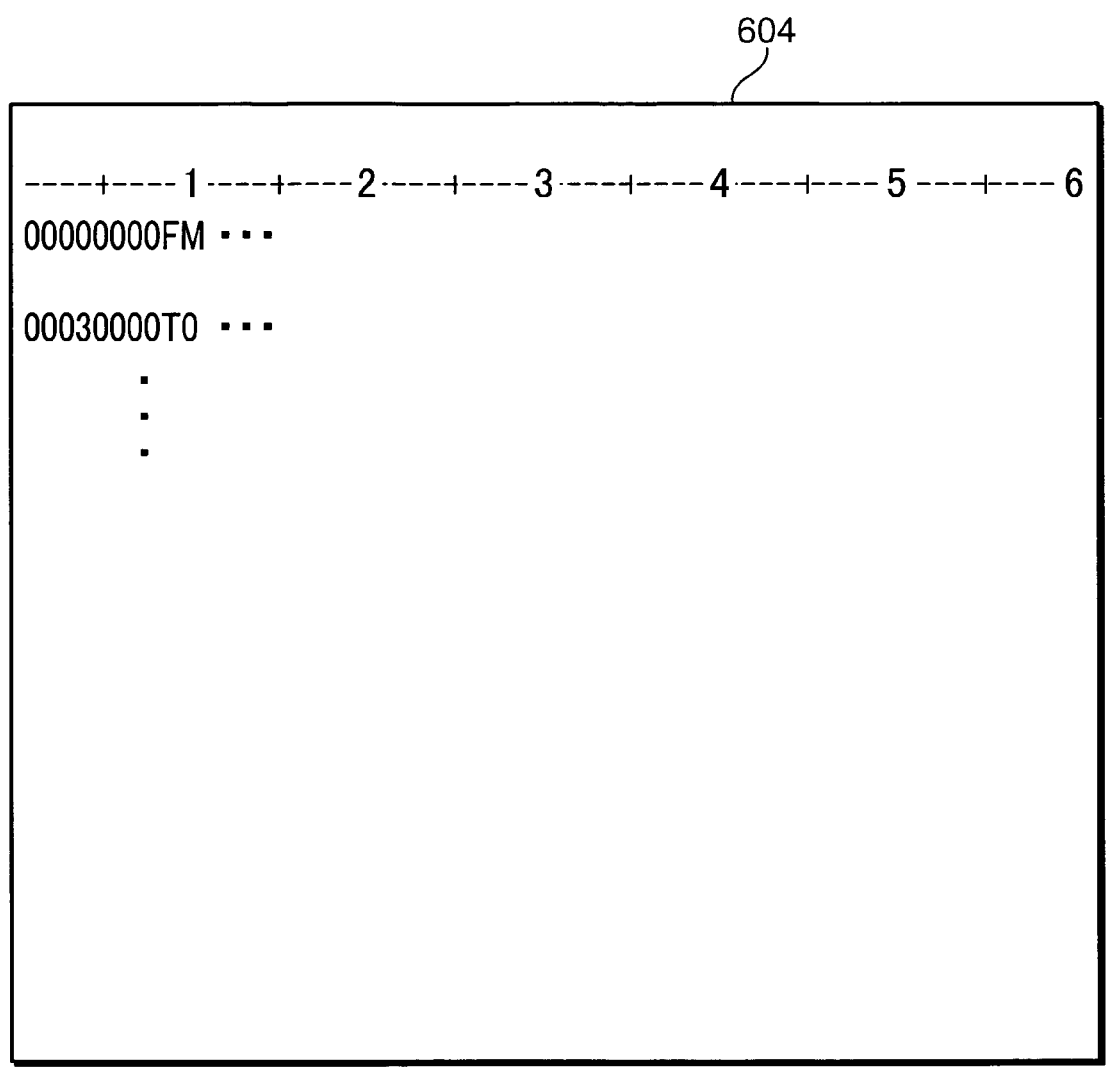
FIG. 14 is a table, showing an example of a CD-RID to be processed in a certain month.
Figure 15:
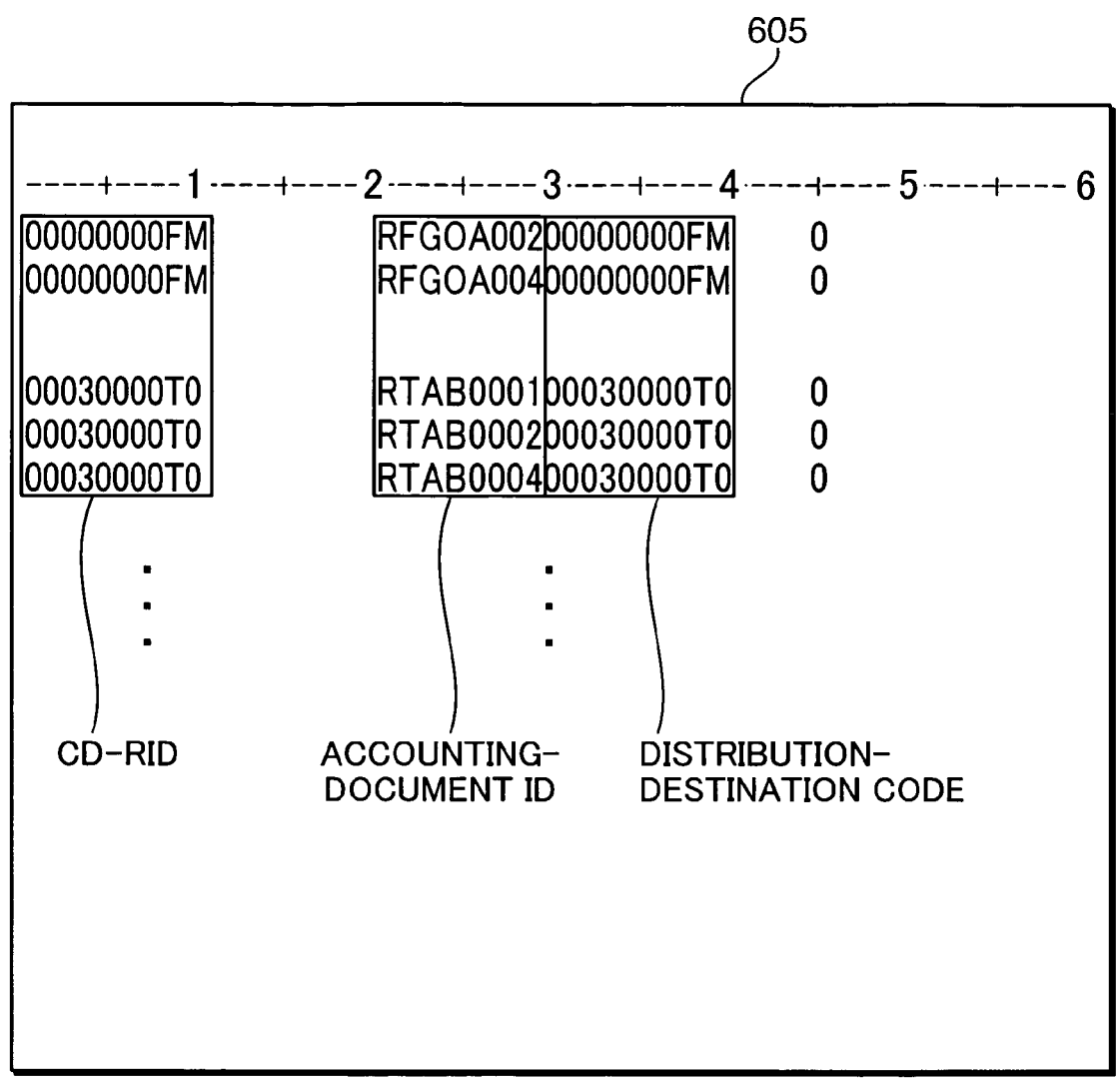
FIG. 15 is a table, showing an example of accounting-document absent data which is extracted from the accounting-document absent data in FIG. 13 and the CD-RID in FIG. 14.

Herein, the processing of extracting the accounting-document absent data will be specifically described. FIG. 11 is a table, showing an example of the file layout of a CD-R inverted master. FIG. 12 is a table, showing an example of the file layout of a definite accounting-document information file. FIG. 13 is a table, showing an example of accounting-document absent data which is extracted from the CD-R inverted master in FIG. 11 and the definite accounting-document information file in FIG. 12. FIG. 14 is a table, showing an example of a CD-RID to be processed in a certain month. FIG. 15 is a table, showing an example of accounting-document absent data which is extracted from the accounting-document absent data in FIG. 13 and the CD-RID in FIG. 14.

A CD-R inverted master file 601 shown in FIG. 11 is made up of: a file identification number 601a; a record identification number 601b; a CD-RID 601c; an accounting-document ID 601d; a distribution-destination code 601e; a 0-piece check flag 601f; and a CD-R storage exclusion flag 601g.

"DC01" is fixed in the first column of the CD-R inverted master file 601. This is used to distinguish a file and a record. In the example shown in FIG. 11, "DC" is fixed in the file identification number 601a, and "01" is fixed in the record identification number 601b. The fifth column is a CD-RID and shows a storage unit of a CD-R. In the example shown in FIG. 11, "00000000FM" or the like is stored in the CD-RID 601c. The twenty-first column is an accounting-document ID. In the example shown in FIG. 11, "RFGOA002" or the like is stored in the accounting-document ID 601d. The twenty-ninth column is a distribution-destination code and shows where an accounting document is distributed. In the example shown in FIG. 11, "00000000FM" is stored in the distribution-destination code 601e. The forty-fifth column is a 0-piece check flag. If this 0-piece check flag is 1, a check is made, while it is 0, no check is made. In the example shown in FIG. 11, "0" is stored in the 0-piece check flag 601f. The forty-sixth column is a CD-R storage exclusion flag. If this exclusion flag is blank, a CD-R is stored, while it is N, a CD-R is not stored. In the example shown in FIG. 11, the CD-R storage exclusion flag 601g is blank.

A definite accounting-document file 602 shown in FIG. 12 is made up of: a year-and-month date 602a; a CD-RID 602b; a distribution-destination code 602c; an accounting-document ID 602d; and the like. Herein, FIG. 12 shows a part of data which is stored as a definite accounting-document file.

First, the accounting-document data division section 203 extracts accounting-document absent data from all the accounting-document data. For example, as shown in FIG. 11, in the CD-RID which is 00000000FM, the accounting-document ID is entered which is RFGOA001, RFGOA002, RFGOA003, RFGOA004 and RFGOA005. In the definite accounting-document information file 602 of FIG. 12, among the accounting-document data whose CD-RID is 00000000FM, the accounting-document ID of the accounting document which has accounting-document data is RFGOA001, RFGOA003 and RFGOA005. Hence, from among the accounting-document data whose CD-RID is 00000000FM, the accounting-document data division section 203 extracts, as accounting-document absent data, the accounting-document data whose CD-RID is RFGOA002 and RFGOA004. The accounting-document data division section 203 extracts the accounting-document absent data, with respect to all the CD-RIDs, such as 00020000G0 and 00030000T0 (refer to FIG. 11). FIG. 13 shows an accounting-document absent data file 603 which is extracted, as described above.

Then, the accounting-document data division section 203 extracts the accounting-document absent data which is created this month. For example, as shown in a certain-month processing CD-RID file 604 of FIG. 14, let's assume that the CD-RID of a CD-R which is required to be created in a certain month is 00000000FM, 00030000T0 . . . . In this case, the accounting-document data whose CD-RID is 00000000FM shown in FIG. 13 needs to be created. Thus, the accounting-document IDs of RFGOA002 and RFGOA004 are extracted as the accounting-document absent data which is created this month. FIG. 15 shows an accounting-document absent data file 605 which is extracted, as described above.

Similarly, the data is described whose CD-RID is 00020000G0. As shown in FIG. 11, in the CD-RID which is 00020000G0, the accounting-document ID is entered which is RGTN5501, RGTN5502, RGTN5503, RGTN5504 and RGTN5505. Referring to the definite accounting-document information file 602 of FIG. 12, in 00020000G0, there is no accounting-document present data which has accounting-document data. Thus, as shown in FIG. 13, RGTN5501, RGTN5502, RGTN5503, RGTN5504 and RGTN5505 are extracted as accounting-document absent data. Then, referring to the certain-month processing CD-RID file 604 of FIG. 14, 00020000G0 does not exist as the CD-RID which is processed in that month. As a result, as shown in FIG. 15, each accounting-document absent data of 00020000G0 is not extracted.

In this way, the accounting-document data division section 203 extracts accounting-document absent data from the CD-R inverted master and the definite accounting-document information file. Then, from among the accounting-document absent data it has extracted, based on the CD-RID information which is processed in that month, it further extracts accounting-document absent data which is processed in that month.

Hence, the accounting-document absent data is extracted from among the accounting-document data which is stored in the accounting-document data storage section 204. This makes it possible to split it into the accounting-document present data and the accounting-document absent data.

Figure 16:
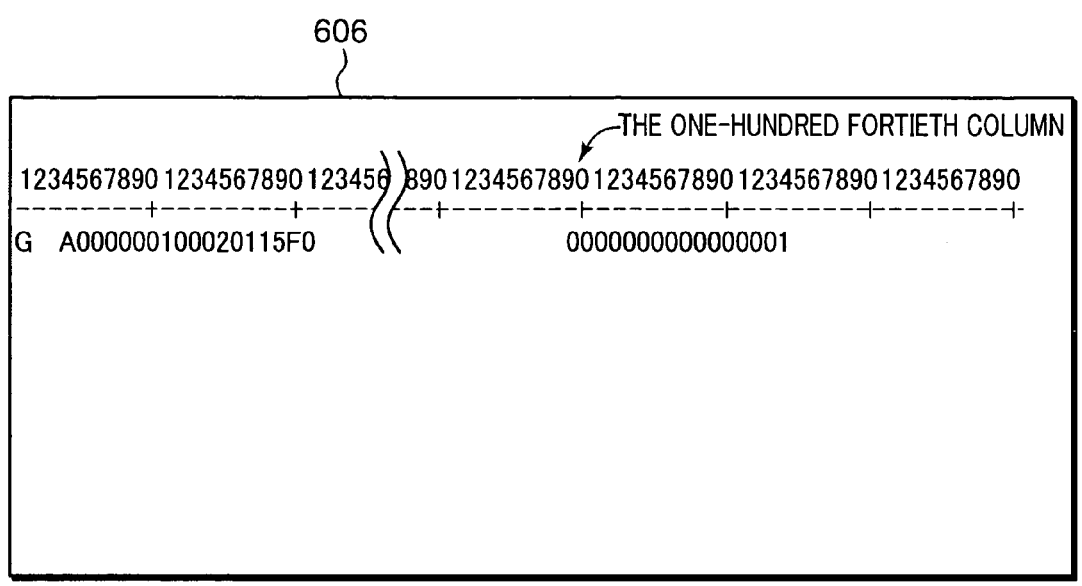
FIG. 16 is a table, showing an example of the record layout of the file of accounting-document absent data.

FIG. 16 is a table, showing an example of the record layout of the file of accounting-document absent data. In a record layout 606 shown in FIG. 16, "G" is fixed in the first column. In the second and third columns, a letter or a numeral is defined as a half-sized blank. An eight-digit accounting-document number is designated in the fourth column. This accounting-document number is the number for identifying an accounting document. It is shown, for example, with an eight-digit number such as "A0000001". In the twelfth column, a ten-digit CD-RID is designated which is used for identifying a CD-RID. It is shown, for example, with a ten-digit number such as "00020115F0". "000000000000001" is fixed in the one-hundred fortieth column. In the one-hundred fifty-sixth, one-hundred fifty-seventh and one-hundred fifty-eighth columns, a letter or a numeral is defined as a half-sized blank.

Figure 17:
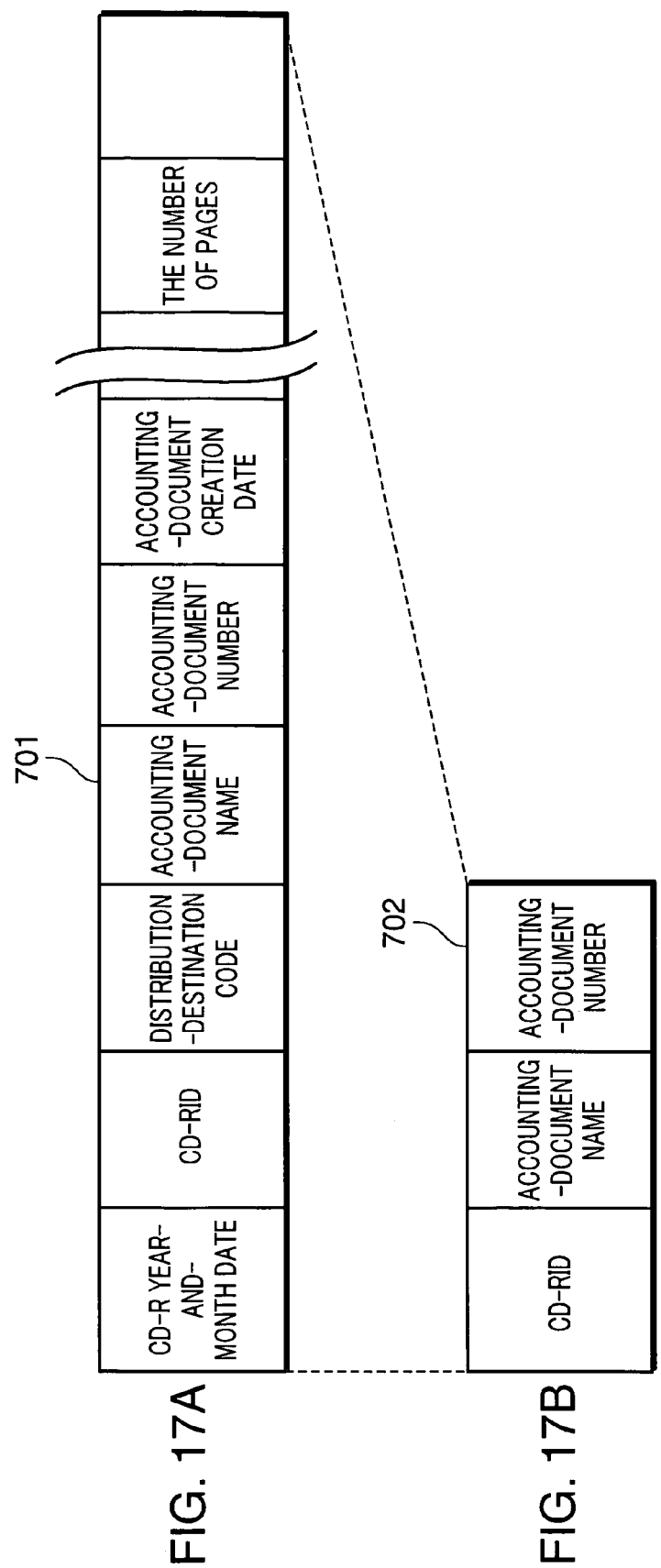
FIGS. 17A and 17B are typical representations, showing an example of the file layout of accounting-document present data and the file layout of accounting-document absent data.

FIGS. 17A and 17B are typical representations, showing an example of the file layout of accounting-document present data and the file layout of accounting-document absent data. FIG. 17A typically shows an example of the file layout of accounting-document present data. FIG. 17B typically shows an example of the file layout of accounting-document absent data.

In a file 701 of accounting-document present data, as shown in FIG. 17A, there are stored: the year-and-month date when a CD-R is created; a CD-RID for identifying a CD-R; a distribution-destination code which shows the distribution destination of a CD-R; an accounting-document name; an accounting-document number; the date when an accounting document is created; the number of pages; and the like. On the other hand, in a file 702 of accounting-document absent data, as shown in FIG. 17B, there are stored only a CD-RID, an accounting-document name and an accounting-document number.

Hence, comparing accounting-document present data and accounting-document absent data, the accounting-document absent data is obviously smaller in data quantity than the accounting-document present data. Conventionally, the accounting-document absent data is transmitted using the same file layout as the accounting-document present data. However, in this embodiment, the accounting-document absent data is transmitted using the file layout which is smaller in data quantity than the accounting-document present data. This largely shortens the time required for its data transmission.

Returning to FIG. 8, in a step S5, the data transmission section 205 transmits, to the accounting-document processing unit 1, the accounting-document data which is divided by the accounting-document data division section 203. Specifically, the accounting-document present-data transmission section 206 generates accounting-document present-data sending-in JCL (or job control language) from the file in which the accounting-document present data is stored. Then, it starts the accounting-document present-data sending-in JCL, so that the accounting-document present data is transmitted to the accounting-document processing unit 1. The accounting-document absent-data transmission section 207 generates accounting-document absent-data sending-in JCL from the file in which the accounting-document absent data is stored. Then, it starts the accounting-document absent-data sending-in JCL, so that the accounting-document absent data is transmitted to the accounting-document processing unit 1. At this time, among the accounting documents which are recorded in a single CD-R, the accounting-document absent-data transmission section 207 transmits, in a batch, the accounting-document absent data in which there is no accounting-document data. In this way, the accounting-document present-data sending-in JCL is generated from the file in which the accounting-document present data is stored, and the accounting-document absent-data sending-in JCL is generated from the file in which the accounting-document absent data is stored. Thereby, accounting-document data can be automatically sent in, comparing the fact that it was conventionally sent in by a person's handling. This reduces the number of operations which is conducted by a person.

Herein, in this embodiment, after a decision is made whether or not accounting-document data should be transmitted, the accounting-document data is divided. However, the present invention is not limited especially to this. After the accounting-document data is divided, a decision is made whether or not the accounting-document data should be transmitted.

In a step S11, the data receiving section 101 receives the accounting-document data which is transmitted by the data transmission section 205 of the accounting-document creation unit 2. Specifically, the accounting-document present-data receiving section 102 receives the accounting-document present data, and the accounting-document absent-data receiving section 103 receives the accounting-document absent data. The accounting-document present data and the accounting-document absent data which are received by the data receiving section 101 are stored in the accounting-document data storage section 108.

In a step S12, the accounting-document data monitoring section 104 regularly monitors the data in the accounting-document data storage section 108. It decides whether or not the accounting-document absent-data receiving section 103 has received accounting-document absent data. Herein, the accounting-document data monitoring section 104 recognizes the file name of the accounting-document present data and the file name of the accounting-document absent data. If the file name is fixed at "XXXXXXXX", that file is recognized to be accounting-document absent data. Herein, if the decision is made that accounting-document absent data has been received (YES at the step S12), the processing shifts to a step S17. On the other hand, if the decision is made that accounting-document absent data has not been received (NO at the step S12), the processing shifts to a step S13.

In the step S13, the accounting-document data monitoring section 104 decides whether or not the accounting-document present-data receiving section 102 has received accounting-document present data. Herein, if the decision is made that accounting-document present data has been received (YES at the step S13), the processing shifts to a step S14. On the other hand, if the decision is made that accounting-document present data has not been received (NO at the step S13), the processing shifts to a step S15.

In the step S14, the distribution accounting-document data creation section 105 compiles the accounting-document present data which is stored in the accounting-document data storage section 108. Using the compiled accounting-document present data, it creates accounting-document data for distribution which can be distributed to the CD-R creation unit 3.

In the step S15, the distribution accounting-document data creation section 105 deletes already-received temporary information (i.e., accounting-document data) which is stored in the accounting-document data storage section 108.

In a step S16, the distribution accounting-document data creation section 105 stores, in the distribution accounting-document data storage section 109, the distribution accounting-document data it has created.

In a step S17, the distribution accounting-document data updating section 106 executes the processing of additional writing in a CD-R connection file. This CD-R connection-file additional-writing processing will be described later, using FIG. 18.

In a step S18, based on the CD-RID of accounting-document absent data, the distribution accounting-document data updating section 106 specifies the distribution accounting-document data which is stored in the distribution accounting-document data storage section 109. Then, based on the accounting-document number of accounting-document absent data, it puts the numeral of 0 in the page number which corresponds to the accounting document which has no accounting-document data in the distribution accounting-document data it has specified. Thereby, the distribution accounting-document data is updated. At this time, among all the records of the accounting documents which should be stored in a single CD-R, the processing-history updating section 107 changes the flag of the record which is now updated by the distribution accounting-document data updating section 106, from "0" which shows that it is not yet processed to "1" which shows that the accounting document is now processed. Thereby, it updates the processing history of the distribution accounting-document data.

In a step S19, the processing-history updating section 107 updates the processing history of the distribution accounting-document data which has been updated by the distribution accounting-document data updating section 106. Specifically, among all the records of the accounting documents which should be stored in the single CD-R, the processing-history updating section 107 changes the flag of the record which has been updated by the distribution accounting-document data updating section 106, from "1" which shows that the accounting document is now processed to "3" which shows that the processing is completed. Thereby, it updates the processing history of the distribution accounting-document data.

In a step S20, the data transmission section 110 decides whether or not the processing history of all the records has been updated in the distribution accounting-document data. Herein, if the decision is made that the processing history of all the records has been updated in the distribution accounting-document data (YES at the step S20), the processing shifts to a step S21. On the other hand, if the decision is made that the decision is made that the processing history of all the records has not been updated in the distribution accounting-document data (NO at the step S20), the processing returns to the step S12. Then, the processing is repeated from the step S12 to the step S20 until the processing history of all the records is updated in the distribution accounting-document data.

In the step S21, the data transmission section 110 The data transmission section 110 transmits, to the CD-R creation unit 3, the distribution accounting-document data which is stored in the distribution accounting-document data storage section 109.

In a step S31, the data receiving section 301 receives the distribution accounting-document data which has been transmitted by the data transmission section 110.

In a step S32, the CD-R creation section 302 records, in a CD-R, the distribution accounting-document data which has been received by the data receiving section 301. Thereby, it creates the CD-R in which the distribution accounting-document data is recorded.

Figure 18:
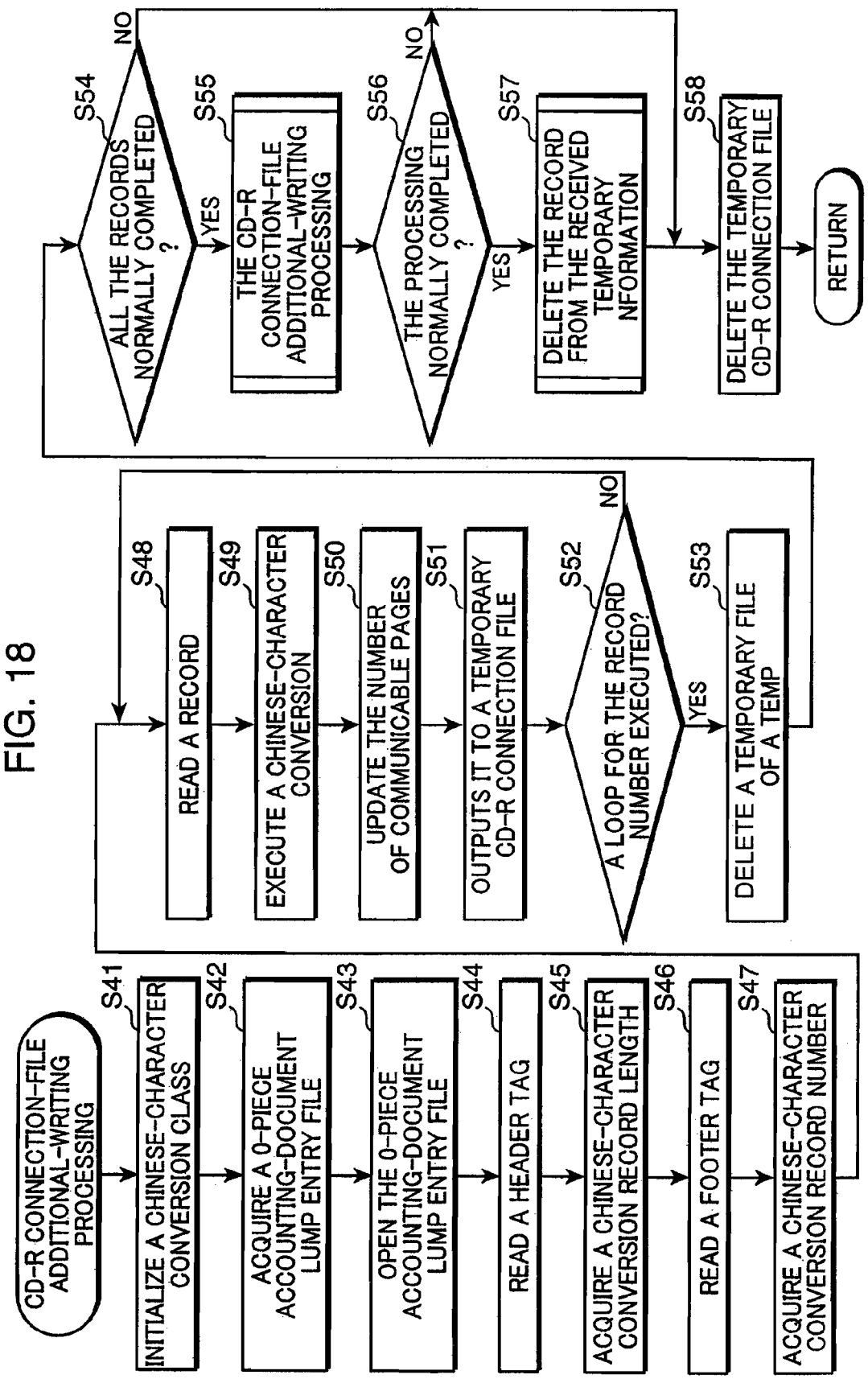
FIG. 18 is a flow chart, showing the processing of additional writing in a CD-R connection file in the step S17 of FIG. 8.

FIG. 18 is a flow chart, showing the processing of additional writing in a CD-R connection file in the step S17 of FIG. 8.

In a step S41, the distribution accounting-document data updating section 106 initializes a Chinese-character conversion class. In a step S42, the distribution accounting-document data updating section 106 acquires a 0-piece accounting-document lump entry file from the accounting-document data storage section 108. Herein, the 0-piece accounting-document lump entry file is a file which is created in the accounting-document data storage section 108 when accounting-document data is received by the data receiving section 101. It is a file which is recognized to be accounting-document absent data by the accounting-document data monitoring section 104.

In a step S43, the distribution accounting-document data updating section 106 opens the 0-piece accounting-document lump entry file. In a step S44, the distribution accounting-document data updating section 106 reads a header tag of the 0-piece accounting-document lump entry file. In a step S45, the distribution accounting-document data updating section 106 acquires a Chinese-character conversion record length which is recorded in the header tag. In a step S46, the distribution accounting-document data updating section 106 reads a footer tag of the 0-piece accounting-document lump entry file. In a step S47, the distribution accounting-document data updating section 106 acquires a Chinese-character conversion record number which is recorded in the footer tag.

In a step S48, the distribution accounting-document data updating section 106 reads a record of the 0-piece accounting-document lump entry file. In a step S49, the distribution accounting-document data updating section 106 executes a Chinese-character conversion of the record which is read in the step S48. In a step S50, the distribution accounting-document data updating section 106 updates the number of pages which can be distributed. Specifically, the distribution accounting-document data updating section 106 updates the distributable page number by initializing the record's page number to 0. In a step S51, the distribution accounting-document data updating section 106 outputs, to a temporary CD-R connection file, the record whose distributable page has been updated. In a step S52, the distribution accounting-document data updating section 106 decides whether or not a loop has been executed for the Chinese-character conversion record number which is acquired in the step S47. Herein, if the decision is made that a loop has been executed for the Chinese-character conversion record number which it acquired (YES at the step S52), the processing shifts to a step S53. On the other hand, if the decision is made that a loop has not been executed for the Chinese-character conversion record number (NO at the step S52), the processing moves back to the step S48. In this way, the processing is repeated from the step S48 to the step S51 for the Chinese-character conversion record number which is acquired in the step S47.

In the step S53, the distribution accounting-document data updating section 106 deletes a temporary file of a Temp folder. In a step S54, the distribution accounting-document data updating section 106 decides whether or not all the records have been normally completed. Herein, if the decision is made that all the records have been normally completed (YES at the step S54), the processing shifts to a step S55. On the other hand, if the decision is made that not all the records have been normally completed (NO at the step S54), the processing shifts to a step S58.

In the step S55, the distribution accounting-document data updating section 106 executes the processing of additional writing, in the CD-R connection file, the record whose distributable page was updated which has been outputted in the step S51. In a step S56, the distribution accounting-document data updating section 106 decides whether or not the CD-R connection-file additional-writing processing in the step S55 has been normally completed. Herein, if the decision is made that the CD-R connection-file additional-writing processing has been normally completed (YES at the step S56), the processing shifts to a step S57. On the other hand, if the decision is made that the CD-R connection-file additional-writing processing has not been normally completed (NO at the step S56), the processing shifts to the step S58.

In the step S57, the distribution accounting-document data updating section 106 deletes the record from already-received temporary information (i.e., accounting-document data) which is stored in the accounting-document data storage section 108. In the step S58, the distribution accounting-document data updating section 106 deletes the temporary CD-R connection file. Then, the distribution accounting-document data updating section 106 reads the CD-R connection file which has undergone the additional-writing processing. Sequentially, it puts the numeral of 0 in the page number which corresponds to the accounting document which has no accounting-document data in the distribution accounting-document data it has specified. Thereby, the distribution accounting-document data is updated.

In this way, in the accounting-document creation unit 2, accounting-document data on an accounting document is created, and then, the created accounting-document data is divided into accounting-document present data which has the accounting-document data and accounting-document absent data which does not have the accounting-document data. Next, identification information for identifying the accounting-document present data and identification information for identifying the accounting-document absent data, are given. Sequentially, the accounting-document present data and the accounting-document absent data which each have been given the identification information are transmitted. Then, in the accounting-document processing unit 1, the transmitted accounting-document present data and accounting-document absent data are received, and the received accounting-document present data and accounting-document absent data are monitored. Based upon the identification information of the accounting-document present data and the identification information of the accounting-document absent data, the accounting-document present data and the accounting-document absent data are identified. Next, a predetermined data processing is given to the identified accounting-document present data, so that it can be outputted in an arbitrary format. Then, the accounting-document present data which has been given the predetermined data processing is stored as accounting-document data for distribution. Next, without giving a predetermined data processing to the identified accounting-document absent data so that it can be outputted in an arbitrary format, the stored distribution accounting-document data is updated, based on the identified accounting-document absent data.

Hence, the accounting-document data is divided into accounting-document present data in which there is the accounting-document data and accounting-document absent data in which there is not the accounting-document data. Therefore, the time that is taken to transmit the accounting-document data becomes shorter than that in the case where the accounting-document data is conventionally transmitted, whether the accounting document exists or not. In addition, a predetermined data processing is given to the accounting-document present data so that it can be outputted in an arbitrary format, the accounting-document present data which has been given the predetermined data processing is stored as the distribution accounting-document data. Then, without giving a predetermined data processing to the accounting-document absent data so that it can be outputted in an arbitrary format, the stored distribution accounting-document data is updated based on the accounting-document absent data. Therefore, the time that is taken to process the accounting-document data becomes shorter than in the case where the predetermined data processing is conventionally given to all the accounting-document data so that it can be outputted in an arbitrary format, whether or not there is the accounting document.

Furthermore, in the accounting-document processing unit 1, the updated distribution accounting-document data is transmitted. In addition, in the CD-R creation unit 3, the transmitted distribution accounting-document data is received, and the received distribution accounting-document data is recorded in the CD-R and then is outputted. Thus, the accounting-document data which is created in the accounting-document creation unit 2 can be outputted in an arbitrary format. Therefore, the accounting-document data which has been created in the accounting-document creation unit can be outputted in an optional format. Therefore, for example, a statutory accounting document can be computerized and stored. Besides, the time required to create the CD-R, or the time required to print data in the CD-R, can be largely shortened. Especially, accounting-document data is recorded in the CD-R where the data which has once been written cannot be physically deleted. This prevents accounting-document data from being falsified.

Moreover, the accounting-document absent data in which there is no accounting-document data is transmitted in a batch for each record medium (i.e., CD-R) by the data transmission section 205 of the accounting-document creation unit 2. Therefore, the time which is taken to transmit the accounting-document data becomes shorter than in the case where the accounting-document data is transmitted, whether there is an accounting document or there is no accounting document.

In addition, accounting-document absent data includes an accounting-document number (i.e., accounting-document specification information) for identifying an accounting document, and a CD-RID (i.e., record-medium specification information) for specifying a CD-R (i.e., record medium). Based on the CD-RID of the accounting-document absent data, the distribution accounting-document data which is stored in the storing means is specified. Then, the specified distribution accounting-document data is updated, based on the accounting-document number of the accounting-document absent data. Hence, accounting-document absent data includes an accounting-document number for identifying an accounting document and a CD-RID for specifying a CD-R, thereby reducing the quantity of data to be transmitted.

In the electronic accounting-document system, electronic accounting-document processing method, accounting-document creation unit and accounting-document processing unit according to the present invention, the time which is taken to transmit and process accounting-document data can be shortened. Hence, they are useful as an electronic accounting-document system, an electronic accounting-document processing method, an accounting-document creation unit, an accounting-document processing unit, and the like, which are used to process, in the accounting-document processing unit, accounting-document data which is created in the accounting-document creation unit.

This application is based on Japanese patent application serial No. 2004-15486, filed in Japan Patent Office on Jan. 23, 2004, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An electronic accounting-document system, comprising:

an accounting-document creation unit including a processor, an accounting-document data creating unit for creating accounting-document data on an accounting document, a read accounting-document file storing unit, for storing information as a read accounting-document file, in which the accounting-document data created by the accounting-document data creating unit is associated with a type of accounting-document and an accounting-document number, a master file storing unit for storing a master file in which all accounting-documents to be outputted are associated with a type of accounting-document and an accounting-document number, an accounting-document data dividing unit for dividing, using the processor, the accounting-documents to be outputted, into accounting-document present data and accounting-document absent data based on the accounting-document number included in the read accounting-document file and the master file, wherein the accounting-document present data contains accounting-document specification information for specifying an accounting document, record-medium specification information for specifying a record medium as an output destination, and the accounting-document data, and the accounting-document absent data does not contain any of the accounting-document data, but does contain accounting-document specification information for specifying an accounting document and record-medium specification information for specifying a record medium as an output destination, an identification-information giving unit for giving the accounting-document present data identification information for identifying the accounting-document present data and giving the accounting-document absent data identification information for identifying the accounting-document absent data, and an accounting-document data transmitting unit for transmitting the accounting-document present data and the accounting-document absent data; and an accounting-document processing unit including a receiving unit for receiving the accounting-document present data and the accounting-document absent data which are transmitted by the accounting-document data transmitting unit, a monitoring unit for monitoring the accounting-document present data and the accounting-document absent data, and identifying the accounting-document present data and the accounting-document absent data based on the identification information given to the accounting-document present data and the accounting-document absent data, a data processing unit for creating output accounting-document data to be outputted in an arbitrary format, wherein the record-medium specification information contained in the accounting-document present data, an accounting document name corresponding to the accounting-document specification information contained in the accounting-document present data, and the accounting-document data contained in the accounting-document present data are correlated to each other, a storing unit for storing the output accounting-document data created by the data processing unit, and an updating unit for updating the output accounting-document data based on the accounting-document absent data, without creating accounting-document data to be outputted using the accounting-document absent data, wherein the updating unit specifies the output accounting-document data stored in the storing unit based on the record-medium specification information of the accounting-document absent data, and writes the accounting document name corresponding to the accounting-document specification information of the accounting-document absent data, and information indicating absence of the accounting-document data with respect to the specified output accounting-document data.

2. The electronic accounting-document system according to claim 1, wherein:

the accounting-document processing unit further includes an output accounting-document data transmitting unit for transmitting the output accounting-document data; and the electronic accounting-document system further comprises an output unit which receives the output accounting-document data and outputs the output accounting-document data in an arbitrary format.

3. The electronic accounting-document system according to claim 2, wherein the output unit records, in a record medium specified by the record medium specification information of the accounting-document present data, the output accounting-document data and outputs the output accounting-document data.

4. The electronic accounting-document system according to claim 3, wherein the accounting-document data transmitting unit transmits, in a batch for each record medium specified by the record medium specification information of the accounting-document absent data, the accounting-document absent data.

5. An electronic accounting-document processing method by which an accounting-document processing unit processes accounting-document data that is created by an accounting-document creation unit, comprising:

a receiving step of receiving accounting-document present data, to which identification information indicating that the accounting-document data is present is given by the accounting-document creation unit, and accounting-document absent data, to which identification information indicating that the accounting-document data is absent is given by the accounting-document creation unit, wherein the accounting-document present data contains accounting-document specification information for specifying an accounting document, record-medium specification information for specifying a record medium as an output destination, and the accounting-document data, and the accounting-document absent data does not contain any of the accounting-document data, but contains accounting-document specification information for specifying an accounting document and record-medium specification information for specifying a record medium as an output destination;

a monitoring step of monitoring the accounting-document present data and the accounting-document-absent data and identifying the accounting-document present data and the accounting-document absent data based on the identification information given to the accounting-document present data and the accounting-document absent data;

a data processing step of creating, using a processor, output accounting-document data to be outputted in an arbitrary format, wherein the record medium specification information contained in the accounting-document present data, an accounting-document name corresponding to the accounting-document specification information contained in the accounting-document present data, and the accounting-document data contained in the accounting-document present data are correlated to each other;

a storing step of storing the output accounting-document data created in the data processing step; and an updating step of updating the output accounting-document data based on the accounting-document absent data, without creating output accounting-document data to be outputted using the accounting-document absent data, wherein the updating step specifies the output accounting-document data stored in the storing step based on the record-medium specification information of the accounting-document absent data, and writes the accounting-document name corresponding to the accounting-document specification information of the accounting-document absent data and information indicating absence of the accounting-document data with respect to the specified output accounting-document data.

6. An accounting-document creation unit for creating accounting-document data, comprising:

a processor;

an accounting-document data creating unit for creating accounting-document data on an accounting document;

a read accounting-document file storing unit, for storing information as a read accounting-document file, in which the accounting-document data created by the accounting-document data creating unit is associated with a type of accounting-document and an accounting-document number;

a master file storing unit for storing a master file in which all accounting-documents to be outputted are associated with a type of accounting-document and an accounting-document number;

an accounting-document data dividing unit for dividing, using the processor, the accounting-documents which are to be outputted, into accounting-document present data and accounting-document absent data based on the accounting-document number included in the read accounting-document file and the master file, wherein the accounting-document present data contains accounting-document specification information for specifying an accounting document, record-medium specification information for specifying a record medium as an output destination, and the accounting-document data, and the accounting-document absent data does not contain any of the accounting-document data, but does contain accounting-document specification information for specifying an accounting document and record-medium specification information for specifying a record medium as an output destination;

an identification-information giving unit for giving the accounting-document present data identification information for identifying the accounting-document present data and giving the accounting-document absent data identification information for identifying the accounting-document absent data; and an accounting-document data transmitting unit for transmitting the accounting-document present data and the accounting-document absent data.

7. The accounting-document creation unit according to claim 6, wherein the accounting-document data transmitting unit transmits, in a batch for each record medium specified by the record medium specification information of the accounting-document absent data, the accounting-document absent data.

8. An accounting-document processing unit for executing a predetermined processing for accounting-document data that is created by an accounting-document creation unit, comprising:

a processor;

a receiving unit for receiving accounting-document present data and accounting-document absent data which are transmitted by the accounting-document creation unit after all the accounting-documents to be outputted are divided, by the accounting-document creation unit, into accounting-document present data and accounting-document absent data, wherein the accounting-document present data contains accounting-document specification information for specifying an accounting document, record-medium specification information for specifying a record medium as an output destination, and the accounting-document data, and the accounting-document absent data does not contain any of the accounting-document data, but does contain accounting-document specification information for specifying an accounting document and record-medium specification information for specifying a record medium as an output destination;

a monitoring unit for monitoring the accounting-document present data and the accounting-document absent data and identifying the accounting-document present data and the accounting-document absent data based on the identification information given to the accounting-document present data and the accounting-document absent data;

a data processing unit for creating, using the processor, output accounting-document data to be outputted in an arbitrary format, wherein the record-medium specification information contained in the accounting-document present data, an accounting-document name corresponding to the accounting-document specification information contained in the accounting-document present data, and the accounting-document data contained in the accounting-document present data are correlated to each other;

a storing unit for storing the output accounting-document data created-by the data processing unit; and an updating unit for-updating the output accounting-document data based on the accounting-document absent data, without creating accounting-document data to be outputted using the accounting-document absent data, wherein the updating unit specifies the output accounting-document data stored in the stored in the storing unit based on the record-medium specification information of the accounting-document absent data, and writes the accounting document name corresponding to the accounting-document specification information of the accounting-document absent data, and information indicating absence of the accounting-document data with respect to the specified output accounting-document data.

* * * * *